(12) United States Patent
Pryor

(10) Patent No.: US 8,072,440 B2
(45) Date of Patent: Dec. 6, 2011

(54) METHOD FOR PROVIDING HUMAN INPUT TO A COMPUTER

(76) Inventor: Timothy R. Pryor, Sylvania, OH (US)

( * ) Notice: Subject to any disclaimer, the term of this patent is extended or adjusted under 35 U.S.C. 154(b) by 0 days.

(21) Appl. No.: 12/897,072

(22) Filed: Oct. 4, 2010

(65) Prior Publication Data

US 2011/0032089 A1 Feb. 10, 2011

Related U.S. Application Data

(63) Continuation of application No. 11/980,701, filed on Oct. 31, 2007, now Pat. No. 7,973,773, which is a continuation of application No. 11/495,666, filed on Jul. 31, 2006, now Pat. No. 7,714,849, which is a continuation of application No. 09/435,854, filed on Nov. 8, 1999, now Pat. No. 7,098,891, which is a continuation of application No. 08/496,908, filed on Jun. 29, 1995, now Pat. No. 5,982,352.

(51) Int. Cl.
*G06F 3/041* (2006.01)

(52) U.S. Cl. .................. 345/173; 178/18.01; 463/30

(58) Field of Classification Search .................. 345/173; 178/18.01; 715/701–702; 463/30, 36–38
See application file for complete search history.

(56) References Cited

U.S. PATENT DOCUMENTS

| | | |
|---|---|---|
| 3,825,730 A | 7/1974 | Worthington, Jr. et al. |
| 4,014,000 A | 3/1977 | Uno et al. |
| 4,146,924 A | 3/1979 | Birk et al. |
| 4,219,847 A | 8/1980 | Pinkney et al. |
| 4,305,071 A | 12/1981 | Bell et al. |
| 4,346,376 A | 8/1982 | Mallos |
| 4,396,945 A | 8/1983 | DiMatteo et al. |
| 4,435,835 A | 3/1984 | Sakow et al. |
| 4,475,112 A | 10/1984 | Green |
| 4,484,179 A | 11/1984 | Kasday |
| 4,613,942 A | 9/1986 | Chen |
| 4,629,319 A | 12/1986 | Clarke et al. |
| 4,631,676 A | 12/1986 | Pugh |
| 4,644,100 A | 2/1987 | Brenner et al. |
| 4,686,374 A | 8/1987 | Liptay-Wagner et al. |
| 4,710,760 A | 12/1987 | Kasday |
| 4,746,770 A | 5/1988 | McAvinney |
| 4,885,565 A | 12/1989 | Embach |

(Continued)

FOREIGN PATENT DOCUMENTS

DE 4323863 1/1995

(Continued)

*Primary Examiner* — Abbas Abdulselam
(74) *Attorney, Agent, or Firm* — Warner Norcross & Judd LLP

(57) ABSTRACT

The invention provides a method for providing human input to a computer which allows a user to interact with a display connected to the computer. The method includes the steps of placing a first target on a first portion of the user's body, using an electro-optical sensing means, sensing data related to the location of the first target and data related to the location of a second portion of the user's body, the first and second portions of the user's body being movable relative to each other, providing an output of the electro-optical sensing means to the input of the computer, determining the location of the first target and the location of the second portion of the user's body, and varying the output of the computer to the display based upon the determined locations for contemporaneous viewing by the user.

33 Claims, 17 Drawing Sheets

U.S. PATENT DOCUMENTS

| | | |
|---|---|---|
| 4,988,981 A | 1/1991 | Zimmerman et al. |
| 5,045,843 A | 9/1991 | Hansen |
| 5,072,294 A | 12/1991 | Engle |
| 5,153,829 A | 10/1992 | Furuya et al. |
| 5,162,618 A * | 11/1992 | Knowles .................... 178/18.04 |
| 5,168,531 A | 12/1992 | Sigel |
| 5,227,985 A | 7/1993 | DeMenthon |
| 5,252,951 A | 10/1993 | Tannenbaum et al. |
| 5,412,189 A | 5/1995 | Cragun |
| 5,459,793 A | 10/1995 | Naoi et al. |
| 5,495,269 A | 2/1996 | Elrod et al. |
| 5,559,301 A | 9/1996 | Bryan, Jr. et al. |
| 5,591,945 A * | 1/1997 | Kent .......................... 178/18.04 |
| 5,618,232 A * | 4/1997 | Martin ............................ 463/25 |
| 5,638,093 A * | 6/1997 | Takahashi et al. ............ 345/173 |
| 5,708,460 A * | 1/1998 | Young et al. .................. 345/173 |
| 5,708,461 A * | 1/1998 | Kent ............................. 345/177 |

FOREIGN PATENT DOCUMENTS

| | | |
|---|---|---|
| JP | 02-105919 | 4/1990 |
| JP | 04-137419 | 5/1992 |
| WO | 92/00559 | 1/1992 |

* cited by examiner

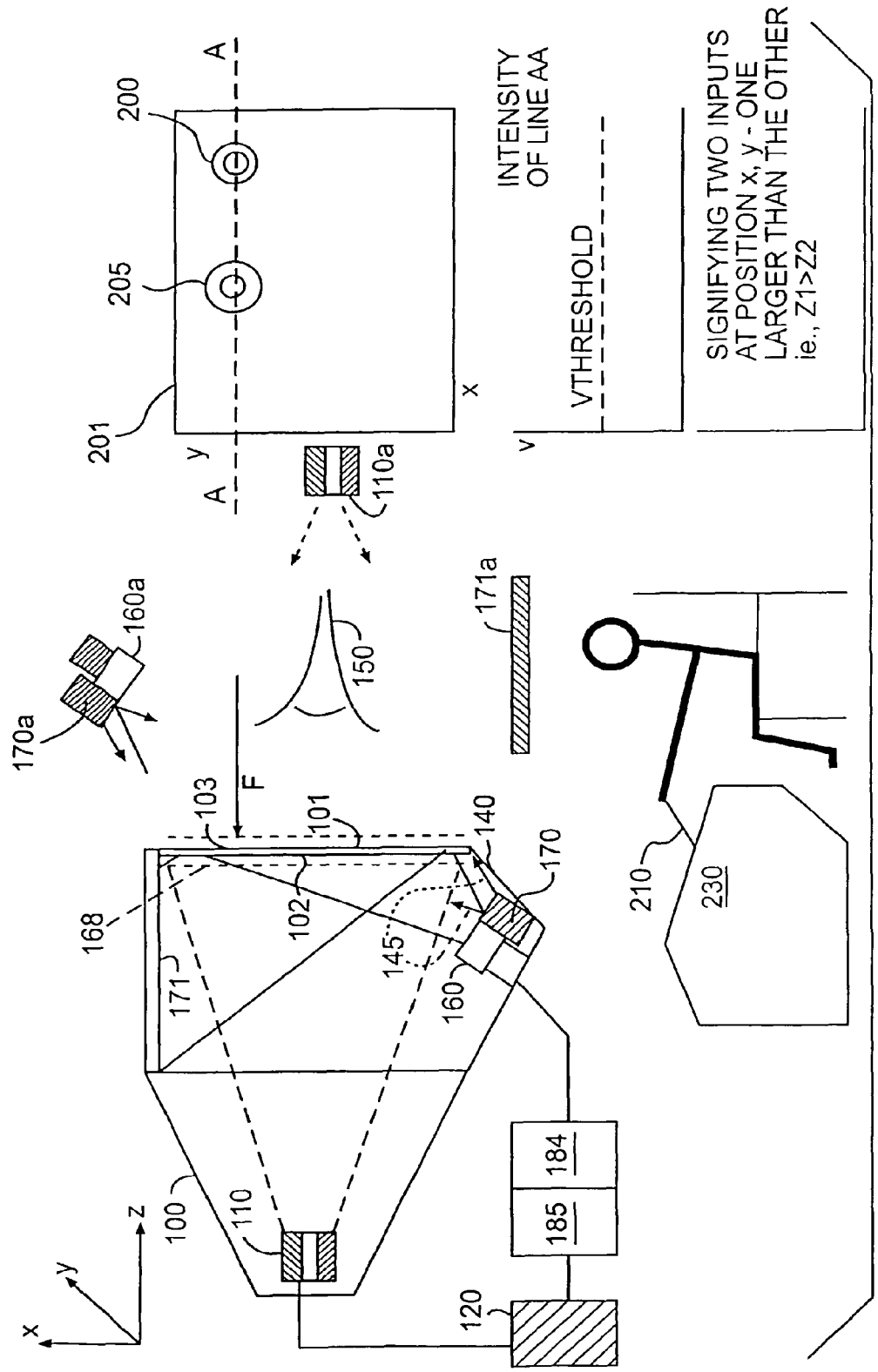

DIRECTION OF MAX ELONGATION

METHOD FOR PROVIDING HUMAN INPUT TO A COMPUTER

This application is a continuation of U.S. patent application Ser. No. 11/980,701, filed Oct. 31, 2007 (now U.S. Pat. No. 7,973,773), which is a continuation of U.S. patent application Ser. No. 11/495,666, filed Jul. 31, 2006 (now U.S. Pat. No. 7,714,849), which is a continuation of U.S. patent application Ser. No. 09/435,854, filed Nov. 8, 1999 (now U.S. Pat. No. 7,098,891), which is a continuation of U.S. patent application Ser. No. 08/496,908, filed Jun. 29, 1995 (now U.S. Pat. No. 5,982,352). The disclosures of the above patent applications are hereby incorporated by reference in their entirety.

INTRODUCTION

The invention disclosed herein is a new type of data entry device for computers and other electronic equipment generally in the category of digitizers and touch screens having several unique properties. It is based primarily on the electro-optical determination of temporary surface distortion caused by the physical input signal, or force, creating the distortion (e.g. a finger "touch"). This is herein referred to as surface distortion imaging and depends on the ability to detect, and in some cases quantify, small distortions of a surface over a large (by comparison) area.

A preferred means of detecting surface distortion is that given in reference 1, which discloses illumination of a surface and subsequent retroreflective re-illumination of the surface from which an enhanced image of the distortion in such surface are created. This method (and the products based thereon sold under the trade name "D-SIGHT™"), is at once, simple, fast, and capable of intelligibly measuring minute distortions over large surface areas. All of these are advantages for the present disclosed invention, and D-SIGHT™ is the preferred method (but not the only method) for determining such distortions. Other optical techniques are grid and moire triangulation, also providing surface distortion data.

Distortion in a material (rather than a surface thereof), can alternatively be used, detected by schlieren, transmissive D-SIGHT, and in photoelastic stress based techniques, relying on stress related differential refraction in the material, rather than deflection of the surface. In both cases video cameras scanning the image of the area of the material or surface are the preferred transduction device.

Also disclosed herein are novel means to determine other events which cooperatively or individually may a be imputed to a computer by means of the invention. These particularly concern electro-optically determinable datums on persons or other entry means.

REVIEW OF THE PRIOR ART

The typical data entry device for a computer to date, has been a keyboard. More recently the "mouse" and "joy stick" have been devised to allow entry of data and particularly picture type data, onto a computer screen.

Tracing tablets (digitizers) have been derived using various technologies for indicating for example, the X, Y location of a pencil stylus, using ultrasonic, inductive or other means.

In addition to the above, such data entry can be combined with a display in a product commonly known as a "touch screen". In this product, data is presented on a TV screen and the human can touch certain boxes typically which have been encoded on the screen to register his input data choice.

In regard to touch screens, these are generally categorized as being either of the non-contact beam-break type usually using multiple light sources or, a type employing multi layer overlays using optical, acoustic, or capacitive phenomenon to determine a location of the touching member.

A brief review of the prior art relative to touch screen technology is given in U.S. Pat. No. 4,675,569 by Bowman. Bowman discloses a touch screen technology using a bezel with piezo-electric elements at the four corners which, upon being stressed by a touch on a glass faceplate for example, creates force signals which can be used to decipher the X, Y location of the pressed point. Presumably this technology could also be used for determination of 3-D force variables as well.

Disadvantages of previous touch screens which are purported to be overcome in part at least by the Bowman invention, are accuracy, shock, wear, reliability and electro magnetic radiation.

Other prior art technology (Touch screen or digitizer) relates to capacitive devices in which one plate is pressed closer to another at a different point and related by a grid scan mechanism and to scanned contact types wherein a grid scan mechanism and to scanned contact types wherein a grid of conductors (either fiber optic or electrical), are caused to be contacted at one point which again can be scanned out.

Other touch screen technology (U.S. Pat. No. 4,700,176) uses surface waves induced in a material which are damped at a given location in space due to the touching arrangement. U.S. Pat. No. 4,740,781 describe conductive film based touch screens. U.S. Pat. No. 4,710,758 addresses the problem of calibration of all touch screens, particularly a problem for those based on analog principles. Problems of electro magnetic shielding of touch screens which can be a problem in secure environments are addressed, for example, in U.S. Pat. Nos. 4,692,809 and 4,591,710.

Where one admits to a conductive stylus or other special writing instrument, then higher resolution transmissive digitizing screens can be contemplated such as that of U.S. Pat. No. 4,639,720. Other "digitizers" not incorporating a screen display are represented by U.S. Pat. No. 3,692,936 describing an acoustic digitizer pad, U.S. Pat. No. 4,177,354 describing a digitizer with a light responsive grid, and U.S. Pat. No. 4,255,617 describing a digitizer with a capacitive grid.

U.S. Pat. No. 4,736,191 describes a digitizer pad which is a type of digitizer capable of providing a X, Y and Z axis indication proportional to the area of touch, a third dimension of sorts.

No known prior art exists in the area of data entry devices based, like the instant invention, on optical surface distortion measurement.

In general, it can be said that all of these prior art devices typically are one or two dimensional, that is, they either register a single command as in a typewriter key or the XY location of a command as for example a light pen location on a screen or a stylus point, etc. It is therefore very desirable to have a three dimensional capability, capable of registering not only the X and Y but also the Z value of a force or displacement caused by a particular entry command. No known commercial devices can do this, and a limited technology set exists for this purpose—especially over large extensive screen or pad areas.

In addition, conventional technologies typically limit the resolution or the size or both of the display to which entry could be made. For example, touch screen data entry is commonly available over a standard let us say 12" to 19" computer terminal to the level of 1 part in 40 in both X and Y. While this suffices for many computer data entry purposes (e.g. selecting icons), it is certainly not suitable for high resolution drawing on a screen or other such activities. Prior art is lacking which can accommodate high resolution "touch" or other inputs easily over large surfaces such as for example data displays in military war rooms and the like. In addition, high resolution seems possible in prior art digitizers only by moving special apparatus or using special writing instruments such as a conductive pen, and high resolution touch screens are difficult with digital technologies such as the discrete grids. Such grids also run the risk of degrading the light transmission characteristics of the screen.

Another drawback of most conventional data entry systems today is that they can only respond to one point at a time. In other words, a single finger on the screen, a single mouse location, a single joy stick entry, a single key on a keyboard. In many applications it would be desirable to be able to enter more than one point at a time or rock back and forth between two points or the like. Indeed it may be desirable to enter not just points but a complete "signature" as in a hand print or the equivalent. This is very useful for recognizing inputs from disable persons, or as a means of verifying authenticity.

Accuracy is also a problem with most digitizers and touch screens, in particular those using analog principles (e.g. the Bowman reference above). Indeed for those digitizers and touch screens based for low cost or other reasons on analog transduction technologies, calibration is often required. One implication is that icon size on the screen must be large, if calibration can't be maintained.

There is virtually no evidence of 3-D capability in the finger touch devices. The closest art found is that of capacitive change in area due to contact with the touch panel.

One prior art device (U.S. Pat. No. 4,639,720) describes an important capability of drawing directly on the screen with commonly used or available instrument (e.g. a pencil). This is a key item in a man-machine interface equation, getting away from the artifice of drawing pictures with a mouse let us say while looking at the screen (the technology disclosed herein also allows one to draw on the screen directly).

ADVANTAGES OF THE INVENTION

The disclosed invention at one and the same time obviates the difficulties above in a manner that is also cost effective. In addition, it contains several unique advantages not known to exist elsewhere, viz.;

1. A potential "four" and "five dimensional" capability, wherein the force vector direction as well as the magnitude of force is measured.

2. An ability to detect dynamic events over a very large area, also with temporary data storage.

3. An ability to have a data storage of a complete signature at once, physically or in memory. The invention has a unique dynamic detection ability due to its image storage capability. No dynamic event detection is apparent in the prior art, and few prior art touch screens, even appear capable of transient or dynamic operation. The invention on the other hand can be used with strobed light sources which can be triggered to capture fast transient events. Even when successive readings are required, several thousand readings a second can be obtained of the complete surface. Transient events can be stored by the image capture medium and in some cases can be actually stored by the sensing surface if it has a hysteresis "memory". This allows it to be used for dynamic "hits" such as those of projectiles on the screen, not just continuous touches.

4. An ability to have the surface distortion or touching input means of any material, completely removed from the actual sensing of the input. Specialized capacitive screens and the like are not required. However, an LCD display screen can for example, be used to form a portion of the surface.

5. In addition, the invention is extremely cost competitive to other touch screen or data entry techniques—particularly for larger surfaces. (For example, one meter square and larger.) The resolution obtainable in these larger surfaces is unmatched, being capable with today's technology, of reaching greater than one part in 10,000 in each direction of the surface (100 million resolvable points on the surface).

6. Unlike most other types of displays, several embodiments of the disclosed invention give a desirable tactile feedback since it is the actual physical deformation (and the amount thereof) that is responsive. Thus the feedback to a finger (or other member) in terms of resistive force is proportional to the desired input. This tactile feedback is particularly desirable in for example the automobile where one should not take one's eyes off the road.

7. Another advantage of the disclosed invention is that it can create a touch screen data entry of very high resolution with such entry made directly on the screen (not on a special pad, as in most CAD systems) with the "beam" of the CRT or other type of display literally following the touch point just as a pencil line would follow a pencil. In this application the 3-D capability allows one to press harder and make a darker (or wider) line for example, just as one would do in normal practice.

The capability of the invention to be ergonomically and "naturally" compatible with human data entry is a major feature of the invention.

8. The reliability of some of the touch screen prior art is questionable. Capacitive devices in close contact are subject to wear, humidity, electric fields and other variables for example. In addition, many prior art touch screens are of specialized construction and would be quite expensive to replace if they were broken, especially as the size increases. In the case of the invention, sensing of the screen is non contact, and the sensing screen can be as simple as a piece of plate glass, or a wall.

Many touch screen designs appear to have problems connected with electro magnetic radiation and can pose a problem in high security areas. This problem does not exist with the disclosed invention.

9. Multipoint Operation. Many of the existing touch screen prior art are capable only of measuring one touch point in X and Y at a time. While some other prior art designs would not appear to preclude multi-point simultaneous measurement, none apparently is disclosed. The invention is easily capable of multi-point operation or even detection of complex area "signatures" not just "points".

As an example of the multi-point difficulties with the prior art, the light curtain type non-contact touch screens clearly have an obscuration problem, as the finger indicating one point obscures the view of another.

10. Reflection and Transmission. The invention, unlike most of the prior art, can be used both in reflection and for transmission measurement of deformation. The camera system used in the device can be used for other purposes as when and indeed the touch screen or digitizing system disclosed can be used simultaneously with prior art systems for a combination effect if desired.

A further advantage of the inventions ability to detect multiple input signatures, etc. at any point on its face, therefore a keyboard, a piano keyboard, a joy stick can be artificially created at any point under computer control or simply by random human command. This is a particular desirability in a car where you cannot necessarily keep your eye on the data entry device or for example for handicapped people who could not be expected to hit the right point on the device every time, but if they just hit the device anywhere, could make a move from that point in a manner that would be intelligible to a computer for example.

11. Common Systems. In addition to the above advantages over the prior art, the invention also has an advantage that it employs essentially standard hardware for any screen size. The same technology is applicable for a screen or "pad" of say 3".times.4" (8.times.10 cm) such as might be in a car dashboard all the way to screens or digitizers; the size of a wall. This allows the cost to be reduced as the technology can be shared.

12. Variable and "Intelligent" orientation. It is also useful therefore to replace in many cases keyboards which have continuous arrays of keys, be they optical, mechanical, contact, electro mechanical or whatever. Unlike most keyboards the disclosed type can "float" (i.e. be at any zone on the surface) which is convenient for people who know how to type but cannot see the keys for example, while driving.

13. Tactile feedback, including programmable. The unique tactile feedback application aspect of the invention allows one to essentially use a deformable member as a sort of miniature joy stick for each finger or to rock back and forth between one or more fingers to create different signals. In addition, programmable tactile feedback such as air blasts, vibration, etc., can also be added easily to the touch surface.

14. Another advantage of the invention is that it can detect a force or displacement signature such as of an object that would be picked up by a robot hand. Of interest as well is the ability to sense the signature of someone, even one who would enter a signature of his palm or what have you. This may be of considerable use to the blind and other physically disabled persons, allowing use of non-conventional inputs (e.g. elbows toes, etc) and the tactile feedback afforded is particularly helpful here.

15. In a gaming and simulation context, the invention has the advantage that it is low in cost, and provides a method by which the game player can participate in a physical way, just as in real sports, and the like.

Further disclosed in this invention is a variation on the invention for use where inputs other than physical touching are used to temporarily deform the medium. This can be TV, thermal, air, vacuum, electromagnetic—or any other physical force which can temporarily either distort the surface in any direction.

The ability of the invention to detect temporary distortions also leads it to be usable over broad areas for unique transduction applications such as weighing trucks on the highway "on the fly", counting lumps of coal on a specialized conveyor belt, counting/weighing and other such applications, or in any other application where transient deflections are the desired signal.

These and other advantages of the invention will become clear in the following disclosure which is depicted in the following figures.

Summary of Advantages To conclude, the invention disclosed herein has numerous advantages, for example:

1. 3-D MYX capability, plus an additional 2-D of vector input.

2. Simplicity and Low cost, particularly for large area applications.

3. Multi-point, and area signature capability, also with simultaneous detection

4. Non-contact sensing of screen deformation due to "touch"—wear free and reliable 5. Excellent dynamic detection of both transients and repeating inputs 6. High accuracy—all digital sensing, no analog calibration required 7. Achievable resolution 1/10,000 in both X & Y, via sub pixel digitization 8. Screen/plate material independent. For example, can generate a surface response on program command, or use transparent media such as rear projection screens.

9. Commonality—all screen or pad sizes can use substantially the same hardware

BRIEF DESCRIPTION OF THE DRAWINGS

The invention will further be described in the following figures:

FIG. 2 is a basic embodiment of the invention in touch screen form utilized with a projection TV (front or rear), and employing a D-SIGHT transduction of surface distortion.

FIG. 7 illustrates a "digitizer" pad embodiment of the invention used as an automotive dashboard input, further incorporating tactile feedback cues, both passive and active, via piezo vibrators, air blasts, sound waves, or the like.

DETAILED DESCRIPTION OF THE INVENTION

FIG. 1

Figure 1:
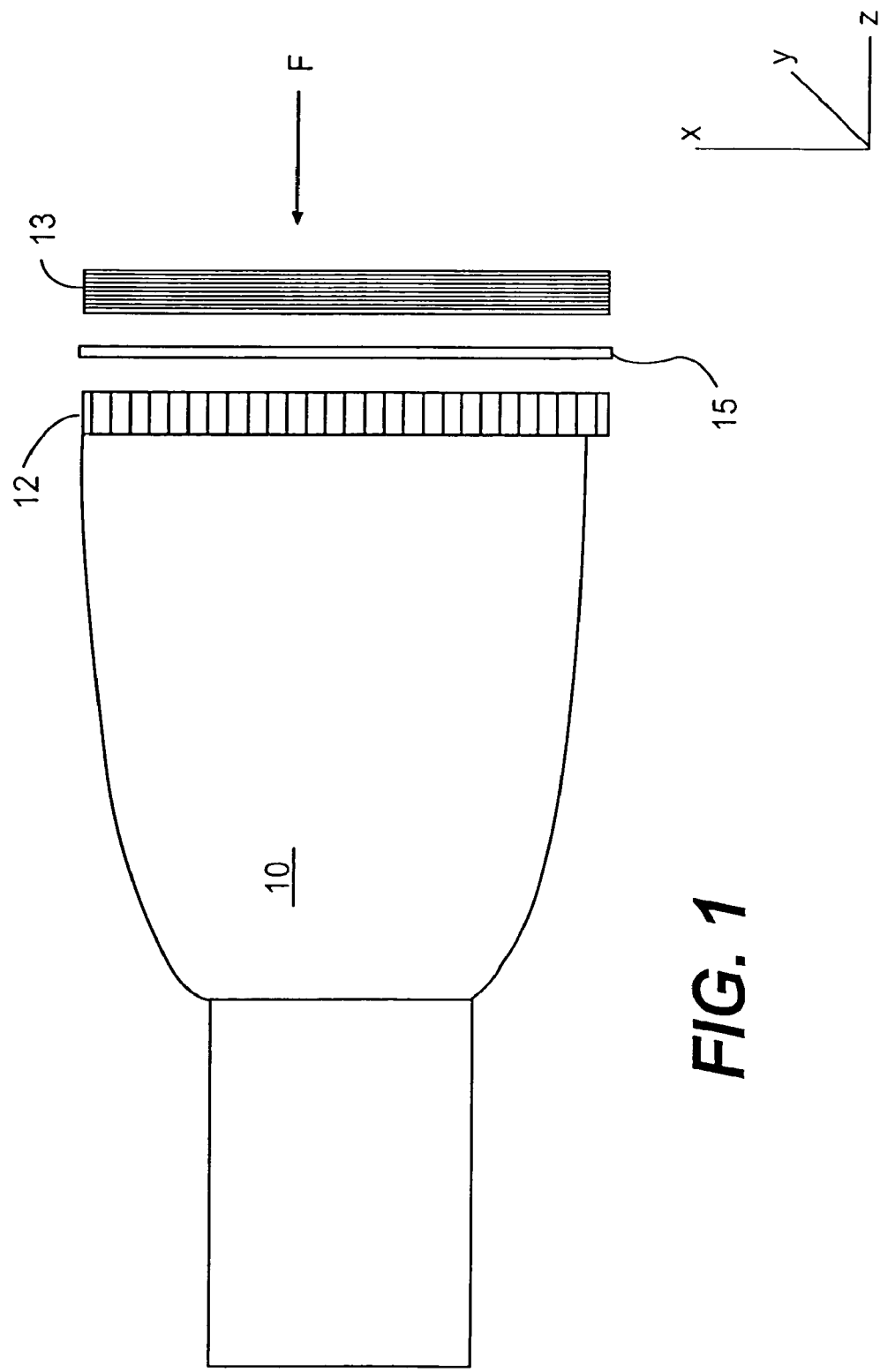
FIG. 1 is a prior art touch screen or digitizer having conducting bars in an orthogonal grid.

A typical prior art touch screen arrangement which, like the invention, operates in a physical touching mode, is shown in FIG. 1. In this arrangement, a transparent member 12 comprised of a periodic set of conductive bars is placed on the front of CRT tube 10. It is opposed by a second member 13, whose surface includes a set of conducting bars in the orthogonal direction. The two conducting surfaces are separated by a third transparent insulating medium 15, having on array of holes in it which can allow the force of touching to push the front surface through to the rear surface thereby making contact. By scanning the conductors electronically, at the point of contact, a signal is generated which then gives the XY location on the screen of the touch.

The resolution of the conventional touch screen technology represented by FIG. 1 is limited in that the horizontal/vertical lines must be wide enough spaced so that one can push through without touching adjacent ones. In addition, both the transduction medium and the separator material, is worn during operation of the device, which can also be affected by humidity, and strong electric fields.

In contrast, the disclosed invention uses a single screen element and does not require overlays on top of an existing screen. LCD flat displays and projection TV can be directly be used. Conversely however, it is generally difficult to use the invention with conventional CRT based TV tubes without substantial modification (especially in regard to the heavy faceplate).

FIG. 2

Consider the operation of FIG. 2, which illustrates the basic embodiment of the invention in its touch screen and data entry "digitizer" form.

A projection TV (such as one may buy in the stores today and typically with a 50" diagonal screen size), 100, is principally comprised of a screen 101 which is illuminated by a projection TV assembly 110, known in the art, comprised of 3 electron guns, red, green, blue, each with a corresponding lens which images the face of the tubes onto the screen 101 in registration, that is, so each of green, blue and red images of the scene commanded by control 120, are overlaid upon one another so as to be able to produce the colors desired with appropriate inputs to the guns.

A viewer 150, looks at the image diffused from the rear projection of the TV onto the screen. For purposes of the invention, the screen 101 has a substantially flat rear surface 102. This arrangement is commercially available.

The goal of the invention is to optically determine the location (and in some cases magnitude and direction as well) of one or more local distortions 103, of the screen, 101 manifested on rear surface 102 upon input of one or more deflecting forces F (as from a finger) which deflects the screen. The optical determination is accomplished preferably by TV camera 160 whose field of view generally covers a substantial portion of surface 102. Visible, IR, UV or any other wavelength of radiation which can be seen by the camera (which could be an IR TV camera for example) is used as the illumination source. The screen can be plain, or have writing or designs on it in certain areas where, for example, input of a certain type is desired.

The preferred method of determining screen deformation shown in this embodiment, is to use the D-SIGHT™ principle described in the aforementioned U.S. patent (ref 1). In this example light source 170 illuminates the rear smooth portion 102 of the screen 101 and light from that smooth portion is reflected to retroreflector material 171 (typically Scotchlight 7615 glass beaded material by 3M company) which then re-reflects it to the surface 102 and thence to TV camera 160.

The light source 170 can be located off the axis of the TV camera lens as shown, which creates a unique contour type "D-SIGHT image", providing a shading effect of any distortion present which indicates the direction, magnitude and shape of the distorted portion of the surface. Alternatively however the light source can be located essentially on the axis of the camera often (through use of a beam splitter or otherwise) and in which case the TV camera input detects a dark zone when the screen is pushed in by the action of the force (e.g. a finger "touch"). Detection of these types of images in the context of this application is further described below.

For example, in pressing on back of painted steel 50 inches square and 0.030" thick secured on its edges, one can see effect of finger moving rapidly, and can see "Z" deformation local to ones finger by the increasing image darkness and spot size at the finger point The effect seems reasonably localized size of indication about size 0.5 inch in diameter as seen on TV screen display of the D-SIGHT image of the steel sheet. At edge of panel near point of support on edges panel stronger, didn't deflect near as much.

Rubber and latex provide extremely local surface deformation But latex as a writing pad is not be as nice as steel, plastic or glass with a hard surface. To improve screen or pad material properties, composite material combinations can be used, e.g. Rubber impregnated plastic, thin glass or plastic sheets with transparent stiffeners, etc.

To operate the invention, the camera is typically scanned out at normal TV frame rates 30 times or 60 times a second, and the determination of the XY location of the force input determined from the centroid of the deflected disturbed light energy. This detection is accomplished in either hardware or software. In the simplest "On-Axis" case (where the light source and camera are effectively co-axial), the centroid "C" in X and Y of dark energy, 200, shown in the representation 201 of the on-axis D-SIGHT image of surface 102, is detected. The methods for accomplishing this detection and for providing, if desired, real time outputs, that is, every frame rate, are described in detail in U.S. patents of reference 2, which utilize the detection of the first or second derivative, the moment, or the average light intensity centroid for example.

The XY coordinates are easily determined by finding the XY centroid location. This can typically be done to resolutions less than the actual pixel spacing on the camera array with 1/10 of a pixel being commonplace as described in the references. In this case we could see that for a 1000.times.1000 array, the sensitivity in XY direction can be 1 part in 10,000 of the screen field.—e.g. 0.1 mm (0.004") on a 1 meter square field.

To determine the Z value representing the deformation proportional to force, the degree of darkness (or lightness) of the spot, (or alternately it's diameter or area for a given degree of darkness such as Vthres or greater, say,) can be determined. For example indentation 205 indicates a larger Z distortion, and thus force F, for a constant elastic property of the screen 101, typically of plastic or glass. If not constant, it can be calibrated and a calibration table stored in the computer 185 to correct each reading. Not only is the area or diameter of light of intensity darker than dark threshold V, but the maximum value of darkness Vmax is higher as well. The harder one pushes, the darker and bigger it gets.

It is noted that the invention can also be used in an alternative front illumination mode as shown, monitoring screen deflection with light source 170*a*, camera 160*a*, and retroreflective screen 171*a*, and/or front projection of TV images on the screen with alternative projector 110*a*.

Also shown in this embodiment is another variation of the invention using a photoelastic technique, which has the advantage of being responsive to stresses induced in transparent media, and not to deflection per se, thus potentially allowing a stiffer member. In this example, the reflective stresses in a photoelastic material chosen to comprise the screen in this case to 101 are determined by placing a coating 138 on the front of the screen (instead of placing the coating that might be used to render the screen more reflective at a certain wavelength to the light 170, on the back of the screen, one can place it on the front of the screen) such that the light from 170 has to pass through the screen material twice. In this way, photoelastic changes in the material can be viewed if the light is polarized as with polarizer 144 and cross polarizer located in front of the camera 145 (also where required allowing for polarization rotation on reflection).

The screen 101 can be of any suitable material which can withstand the force F, and deflect proportionally thereto. Or it can be curved, as well as flat, and be made up of individual cells rather than one piece as shown. The system can operate with front or rear projection and front (or rear) screen distortion monitoring.

It is noted the viewer can wear LCD or other electrically shutterable glasses which allow alternate frames of stereoscopic TV projections to enter the eye, to recreate the stereo effect. Other stereo effect methods such as alternate left right polarization or any other technique to provide stereo in conjunction with the invention can be used.

In this it is noted that a single television camera 160 with a 1000 by 1000 pixel elements can be used to look at the deflecting surface 102. If more resolution is desired, more dense pixel cameras can be used or conversely multiple sets of cameras can be utilized, each one looking at a given portion of the surface with the results combined. It should be noted that where accuracy rather than resolution is required it is necessary to calibrate the camera and optical system for the best results, using either known inputs or a grid pattern such as 168 placed on the surface which can be utilized to correlate surface points to points in the image plane of the lens at the camera.

Applications

Now let's explore some of the applications of the invention depicted in the above embodiment. Compared to the prior art, I feel the invention can produce much higher resolution on a large screen basis, at least in the rear projection format. In addition, this resolution is digital depending in its primary manner on the digital fixed position of the individual detectors (pixels) on the array chip. This means that it is intrinsically self calibrated and free from analog drift as common to other types of touch screens or digitizer technologies which claim high resolutions.

The invention is well suited for simulation such as in an arcade game or for training simulations. The video inputs can be anything, including interactive video from disk where different scenes are called up as a result of the input force, touch or hit. One can actually even project in 3-D on the screen for the observer 150 equipped with special glasses (to view alternate stereoscopic images). One can have extremely real effects where the human observer can in turn throw an object at something, hit it, shoot at the screen or whatever the input is desired to interact with the video on the screen. With 3-D, the point of perceived impact on the screen can be at, in front, or behind the screen itself, with appropriate compensation for same, in determining where the impact would have been relative to the image.

The second major application is the use of the invention as a CAD design terminal where one could easily picture the embodiment of FIG. 2 tilted on its side to present the screen at essentially a 45 or 30 degree angle to the horizontal and so usable in a drawing board format, such as 230. It can even be horizontal itself as in a desk top for that matter. Indeed, the cost of having such a device as a desk top needn't cost much more than $5000—television, desk, inputs and all. This puts it easily within the realm of executive desk top devices where literally the desk becomes the viewing and input means.

In the case of a CAD entry, it can be with a touch or for more detailed entry, with any sort of stylus device as in a pencil such as 210. (with highest resolutions generally resulting from taut rubberized screens). In the 3-D context, the more one pushed on the drawing instrument, finger, pencil, pen or whatever, the darker a line could be if one was actually drawing on it using it in a drawing mode.

For use as a digitizer or as a touch screen, the invention has a very desirable tactile "feel" of it, i.e. it the more you push, the more resistance your feel and the more it registers. This tactile feel will vary depending on the type of material chosen. While it is generally contemplated that single membranes, at least over some portion of the total surface area would be utilized to keep the device simple and watertight, etc. this might not need to be the case.

For example, a surface composed of links effectively hinged could be utilized much as one might think of smaller surface elements chained together which could deflect as miniature plates about the hinge points could be utilized. They could be either chained together to form a larger overall membrane or they could be just simply hinged to simple supports much like a present keyboard. In this particular issue which is measured with D-SIGHT™, it is not so much deflection of the "key" so produced that causes the reading but a slope change for example due to an increasing slope caused by one pushing in on one of the "keys". Another advantage of the FIG. 2 device is that it is responsive both to the pressure of the finger in as well as any sort of force that would tend to pun the screen out. In this manner, it differs greatly from almost all other touch screen devices. While one cannot touch "out", in general, there are forces, the most obvious one being vacuum, that can tend to pull the screen material outward. These include electro magnetic, electrostatic, and thermally induced forces and the "two way" ability of the invention to register such an input is notable.

We should add that these concepts, while they've been shown in the context of a rear projection display device as in FIG. 2, are really quite usable in the context of the invention with any sort of display device. For example, screen 101 could be a LCD device would not require guns (and respective lenses) 110 for projection. It might be essentially self generating. Typically such LCD devices do require a fight source which could be located in the place of the guns to illuminate the LCD. Interestingly, the same light source 170 used for the readout of the screen deflection, could even be the one that illuminates the LCD's, particularly if one was viewing at an angle. It should be noted that to keep the light source 170 from being obtrusive to the observer, one may choose an infrared light source such as infrared LED's (and if desired, a corresponding bandpass filter in front of camera 160). This makes the camera 160 responsive only to the light from the light source 170 and conversely keeps the eye from being able to pick up any light that may escape through the front of the screen from the light source 170.

In the CAD data mode, the position coming from the centroid detection electronics 185 connected to the camera, is shown in the flow block diagram to the gun control drive electronics 120 to if desired, allow an electron beam in one or more colors to trace directly behind the contact point or in fact because of the speed of the device, within a 30th of a second, to overlay the contact point. This allows one to actually follow one's drawing right on the screen with the computer generated rendering thereof. Conversely, the human can trace on, or create, a TV image if desired. This ability to draw right on the screen is a major advantage of the invention. The scan of the CRT (or an equivalent projection unit such as a LCD light valve, or micromechanical multimirror device) traces a point (and with suitable latency a line or image) to follow the point drawn by the user. A computerized rendering capability can be provided using fill in to correspond to a human using a shading pencil, etc—a capability not available with any other touch screen technology known today.

Even voice can be stored along with the rendered image. In using 3-D stereo, one can compute the location in the interior which is being drawn and enter its coordinates If one knows the timing of the touch or event, one can actually strobe the light source to catch this event precisely so that no blur exists. Conversely, one can also simply read the TV camera display at a certain time as well since some TV camera frames can be read out as many as 2000 frames a second (Kodak Ektographic TV camera) the actual registering of dynamic inputs, etc. can be done.

It should be also noted that the camera unit does not require in general, the calibration of the device. However, for odd viewing angles, special high accuracy considerations, etc., one can use a pre-calibrated screen in which the Z direction inputs and/or XY locations are stored in memory in an accurately calibrated manner. This is shown in the block diagram of FIG. 4 as an optional look up table for stored values. Alternatively, fitting of curves to data and other means to more accurately predict position can be used.

FIG. 3

Figure illustrates details of a system according to an invention for 3-D CAD drawing. In the application shown the person draws a picture which is to be entered into the computer and in an embodiment actually modifies using his drawing project on the surface/screen by the projection TV set. As the operator places his pen (e.g. 210) on the screen and pushes. Cameras 170 image pick up location can be digitized by high speed circuit at the frame rate of the TV camera which can for best operation run as fast or faster than the primary projection.

If further information is desired such as the force and therefore the depth which the screen deflects can be determined (and if desired the direction) and this data fed as well to create either a shading rendition of the TV projection or some other suitable modification.

Figure 3A:
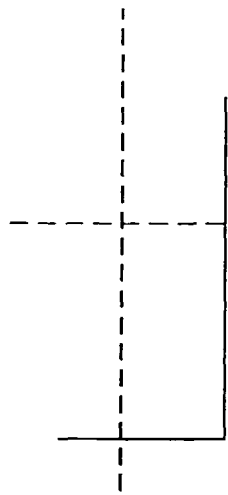
FIGS. 3A-3C illustrate D-SIGHT images when sensing force vectors using the FIG. 2 device.
Figure 3B:
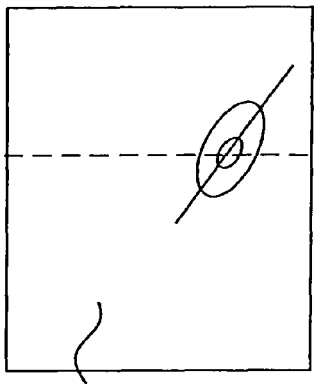
Figure 3C:
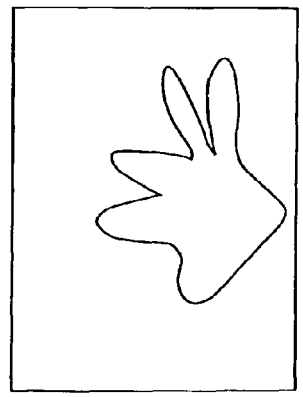
Figure 3:
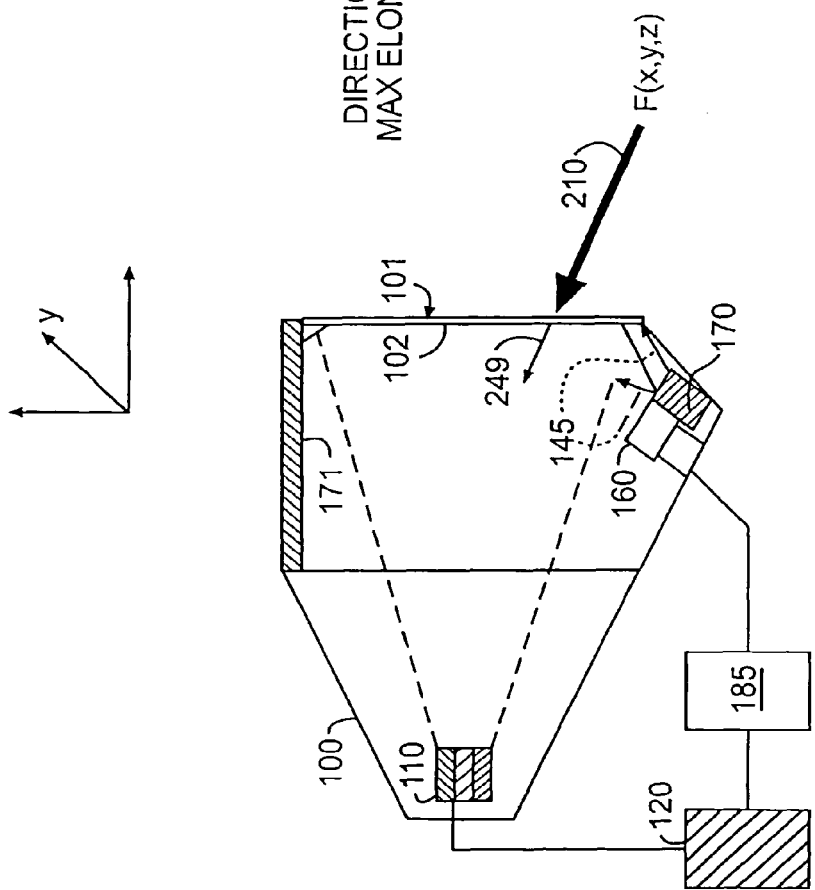
FIG. 3 illustrates sensing of force (displacement) vectors using the FIG. 2 device, and includes a hand print evaluation aspect of use to the handicapped.

Illustrated in FIG. 3 is the type of optical D-SIGHT image seen when off-axis illumination is used, as is illustrated in FIG. 2. In this case the light and dark regions of the image of a local indentation reflect the curvature of the surface, with a zero crossing indicating the centroid location in the direction scanned. In the case where the force F is not normal to the surface, the surface is indented in a direction at a (non normal) vector 249 to the surface, 250.

One can, with both on and off axis illumination, measure the distortion (elongation) in shape in the D-SIGHT image of the local surface distortion, as shown in FIG. 3B, to determine the force vector direction. For utmost accuracy, means may be employed to calibrate (and store in calibration tables, to be applied to the instant distortions determined) said distortion as a function of vector direction, if the movement is non-linear for a given screen material.

As shown in FIG. 3*c* even a hand print can be used to enter data, with each finger, thumb and palm registered by the camera, and classified by the computer system in proportion to their deflection and force. This can be useful for the handicapped, and for security systems. It also is use full as each finger can register independently and thus a keyboard or other touch guide printed or indicated on the screen can be activated by each finger even simultaneously.

It should be noted that the calibration system mentioned above is particularly applicable if one wishes to sense the force vector. The off-axis D-SIGHT version in particular is capable of showing the actual shape of the distorted area from which one can infer a direction of force. This is particularly true if one assumes that the object is reasonably well known. For example, one might have a particular calibration set up for a pencil or pen point whereas another calibration might be used for fingers, indeed, one might even precalibrate a certain person's finger or handprint for maximum accuracy. Such a hand print is shown in FIG. 3*c* which shows the XY outline and Z force darkening where the hand signature appears and the 3-D shape that can be printed out therefrom. Its noted that such a "Print" can also be used to identify and or determine the location of objects placed on a pad according to the invention, as for robotic pickup.

As described above, a dark centroid indication can be detected relative to a uniform background indicating little surrounding distortion. If there is however some hysteresis, that is, that the surface does not immediately go back to its original location but stays slightly deflected, then one can actually sense the distortion not relative to a zero-base but relative to what it was the previous time simply by subtracting the two images (or answers) and then normalizing the two inputs. This means that this has a very desirous capability of making the system impervious to let us say wear on the screen manifesting itself as permanent or semi permanent distortion.

Another salient feature of distortion detection employing retroreflective systems, e.g. D-SIGHT™, is that the readout is relatively immune to the overall shape of the screen. This means that instead of being flat as the screen is shown here, it could even be curved in any shape whatsoever within reason. This allows convex screens to be used, for example in a game where the human interacting with it is "surrounded" by the screen, and he can hit out at objects coming from different directions toward him say. Convex screens in the shape of human torsos can be provided in medical simulations to allow a surgeon trainee to "Cut" the screen with an indenting "Knife" simulating an operation, for example.

Touch Screen Material

A front surface for touch screen embodiments of the invention which can maximize deformation under load, and therefore sensitivity thereto, is stretched rubber as used in other applications of projection TV's already. Stretched rubber (e.g. latex) has the ability to be extremely deformable on a local basis thereby improving the resolution of the system of distortion in general, since even if the camera distortion can pick up images to within a part in 10,000 in both X and Y, the elastic properties of the membrane or other structure that is used for the face plate so to speak, is perhaps the limiting resolution factor, since the stiffer this member is, the more it tends to delocalize the effect, that is broaden it out, over a larger area thereby making it more difficult to distinguish a precise point.

Obviously rubber is an extreme case of a membrane which could literally deform around a point of a pencil for example. Not always is this desirable either, as stiffness is sacrificed.

Because of this, plastic, glass, and the like are preferable for most touch screen applications of the invention, where rear projection is used. In front projection, any material can be used, even painted steel.

Note that the screen material may also be chosen for the feel it provides to the human interacting with it via touch. For example, in simulating the petting of an animal in a children's petting zoo game, the screen should be somewhat deformable to give as real as possible flesh like feel to the child as he strokes the animal image on projected on the screen. For simulation purposes, the animal can give out different sounds, and make movements using video called from memory (or computer generated if animation technology is used) in response to the inputs made. Even voice input can be combined with touch.

Note too that one can have interchangeable screens, where different touch or other characteristics of the screen are chosen to suit the application desired. Further characteristics can be screens with preprinted characters or colors, special overlays on portions of the screen, active touch feedback, and the like.

FIG. 4

Figure 4:
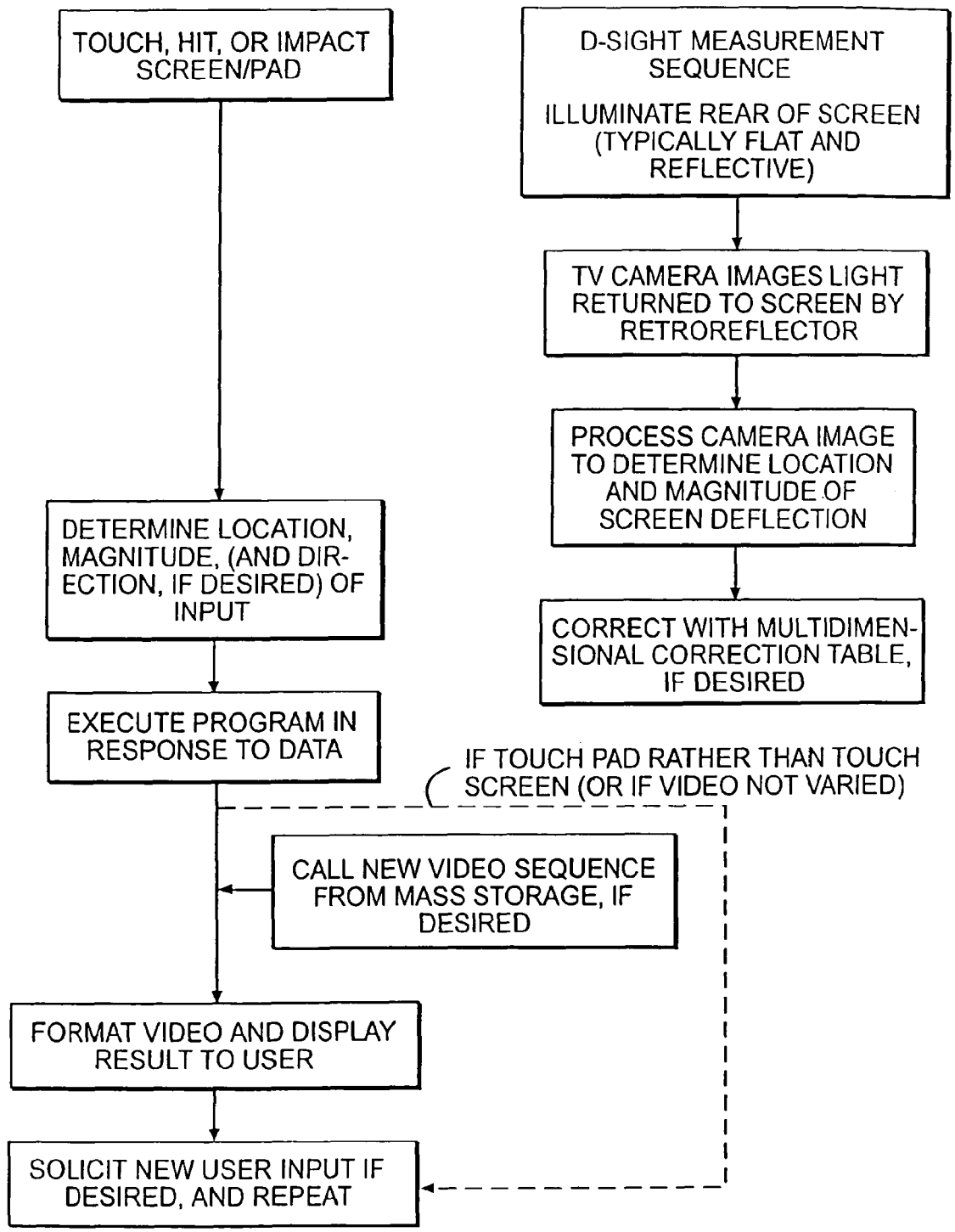
FIG. 4 illustrates a block diagram of one embodiment of the invention

FIG. 4 illustrates a block diagram of a touch screen embodiment of the invention. Steps involved in a particular case using a D-SIGHT based surface distortion measurement are shown on the right hand side of the figure. Other grid based or photoelastic systems would function similarly, in so far as their input to the computer 185 (and any specialized processing circuitry or software, 184).

FIG. 5

It is an advantage of the invention that the screen material can be of any type as long as it sufficiently deflects (or other wise registers an appropriate optical signal) and is capable of withstanding the force of a projectile or other object which touches the screen. As pointed out above, the device is usable with or without the rear projection or other display on its face. For example, simply as a digitizer or as a device used for firing ranges where the front screen would be made out of KEVLAR and the system simply used to find where the bullets land and optionally at what force which can be imputed to their terminal velocity, etc. This is highly useful for firing ranges to allow direct input, statistical monitoring, etc. back to the firing point (In essence, a permanent target so to speak). The use of simulation however, with such a device, makes it even more exciting where one can actually see combat scenes on the screen and fire at them. In this case, the larger the screen the better to make this scene more realistic.

The interactive video ability is electrifying. One can see a 3-D image on the screen, and throw, fire or otherwise direct a projectile at a certain point on it and then see immediately through the use of video disks or the like the result of the action with an image called up from memory to correspond to the data read out by the camera 160 relative to the impact. This could also not just be from projectiles but also from actually hitting it with your fist.

Figure 5:
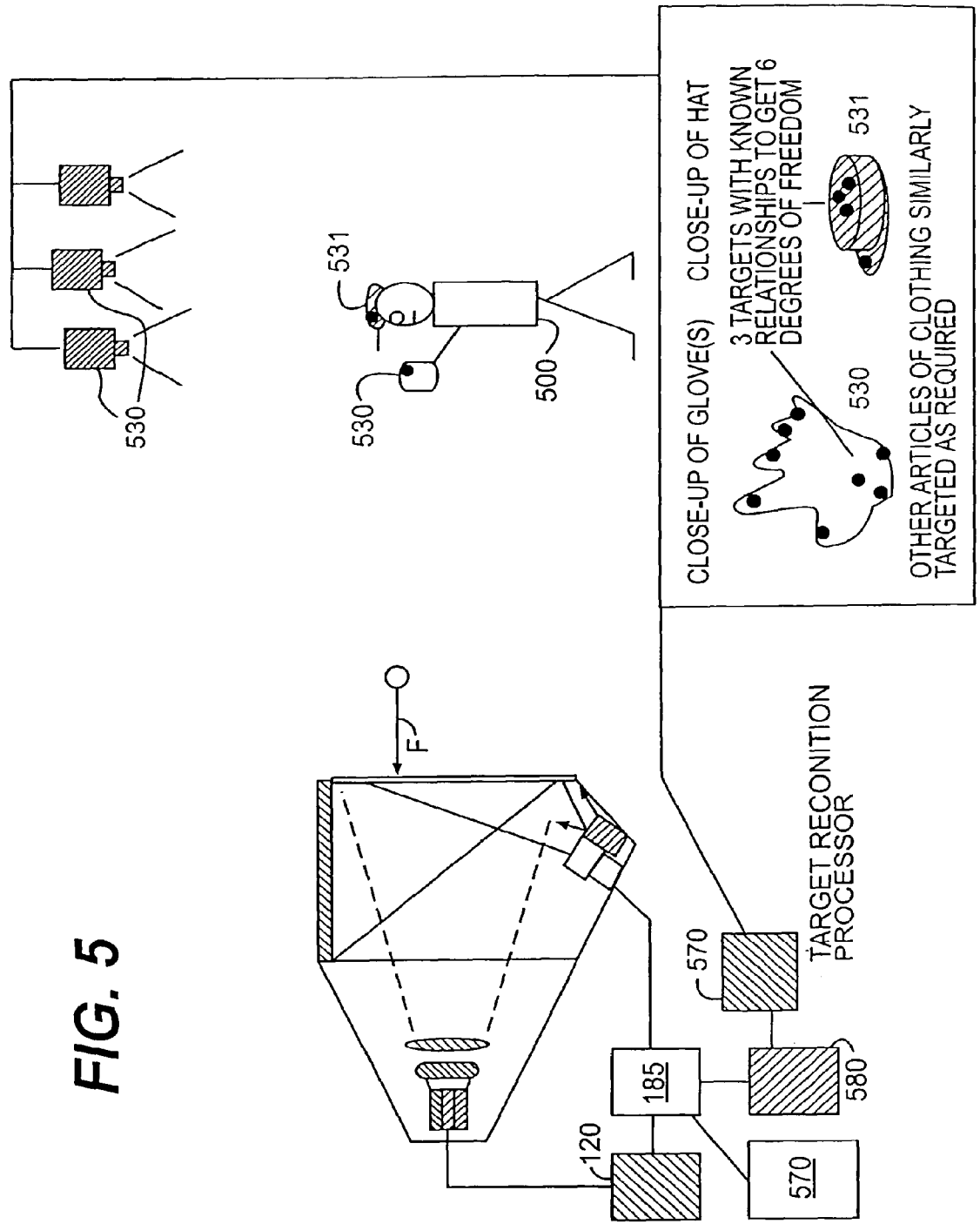
FIG. 5 illustrates a combined system employing a target tracking embodiment of the invention and touch screen embodiment similar to FIG. 2 for use with projectiles.

FIG. 5 illustrates a ball throwing application of the invention wherein a person 500 throws a ball 501 at screen 101, on which for example a picture of a second baseman is shown. If the ball is detected to hit at the proper location and velocity, the second baseman is shown to catch the ball on the interactive video displayed.

If however, the ball was thrown improperly, the second baseman video can show him running to a wrong location on the field, or missing the ball entirely. In this manner the person 500 can "play" baseball. Similarly, he can hit a ball with a bat at the screen, or whatever. The video storage 520 is used by computer 185 to select and display the proper video sequences.

Further illustrated is another embodiment of the invention employing target datums as a man machine interface which can be used independently or in combination with the surface distortion as shown above.

As shown, the person is tracked in space with targets on his hands 530 and hat 531 from overhead using cameras 550 and stereo photogrammetry. As shown in the inset, typically there are multiple target sets, on all objects, to allow multiple degrees of freedom (even all six, such as x, y, z, roll, pitch, and yaw,) of position and motion to be detected, and to allow all fingers, wrist movements, other joint movements to be discerned separately as desired.

Let us consider the operation of the system. The best results are obtained when the human operator or other data entry object wears on his person, at the areas which need to be identified, retro reflective target datums, which can be illuminated from various camera positions and are clearly visible and distinct. This allows the a low cost target recognition processor 570 to be used. Image processing occurs at real time camera rates e.g. 30-60.times. a second and creates little ambiguity as to where target points are.

In a case of a large number of targets in the field of any one camera, there needs to be a coding provided such as through target shape, arrangement, or color codes (where color cameras are used. The use of such passive retroreflective targets are considered less intrusive than active LED type targets. New, is the ability of the invention to take this data into the computer to perform a task, and the use in combination with the surface distortion embodiment invention to provide a complete solution for creation of a sensing environment of the person.

For example, in ball throwing, the position of hands, and other parts of the body are also important in determining its trajectory, spin, etc, and these can be recognized by activity computer 580 and computed to feed data to the control computer 185.

There is a major advantage of the above invention for the physically disabled. The Intent is to provide data inputs to the computer so that the disabled can indicate to the computer where he would like a type of data entry to be made without the necessity of doing conventional pass for such efforts such as the touch screen, keyboard or mouse. It is noted that the target tracking can be used in combination with the surface distortion imaging described above to allow other extremities to be utilized to make such indications as well. For example, the person's feet, it could be touching a "pad" which was imaged from the bottom so as to detect the positions of the heel, toes, whatever or other features and the various forces if desired that were exerted. This could be even done lying down, where the persons whole body was on the device. Both of these inventions, in fact, are suitable for patients in bed.

It is noted however, that this invention can be used for other purposes as well; such as the ability to enter dance steps wherein the feet are able to move on the pad as shown and the hands, and head movements are tracked overhead. This allows one to do a dance, and enter the data into the computer for the dance. This also holds for sporting events, tennis, etc.

In addition, it is contemplated that under certain conditions it maybe possible to utilize even naturally occurring features of the person; such as the tips of the fingers, the centroid of the head location, etc. to act as targets. For example Matrox "Image 1200" image processor for the IBM PC can locate a finger tip on a contrasting background within a few seconds. Peoples features and clothes can be "taught" to the system to increase the ability to locate the feature in question rapidly in space. Templates or coding mechanisms are created to match the feature in question.

The stereo cameras can be located as well right at the screen, looking outward at a game player, for example. The cameras can be built right into a rear projection TV set in this way, and serve double duty as inputs to video TV transmission for teleconferencing or other purposes.

Objects for data entry can also be artifacts that humans use in gaming or other activity. For example, a steering wheel of a simulated car can be targeted, as can the gear shift lever, etc. Changing the game to a plane, boat, golf club, bat, paddle, racquet or what ever, only means changing software, as determination is via the computer vision system, with no need for wires etc to the object artifact. Other non contact, or contact detection systems can also be used where appropriate.

Other sensors which can also be used to determine human or object position include radar sensor, or ultrasound with a transmitter, for example located on the person, or with a transmit and receive function provided on the TV set, allowing passive human interaction. Even a phased array radar, that can tell the location of a number of the objects in front of it can be used. Such location is important in many games, as one would like to control the video display as to the position of the player, and what he's doing. This is not just limited to overall location or a head tracker, but can be expanded to encompass the gestures and movements of the player.

FIG. 6

Figure 6:
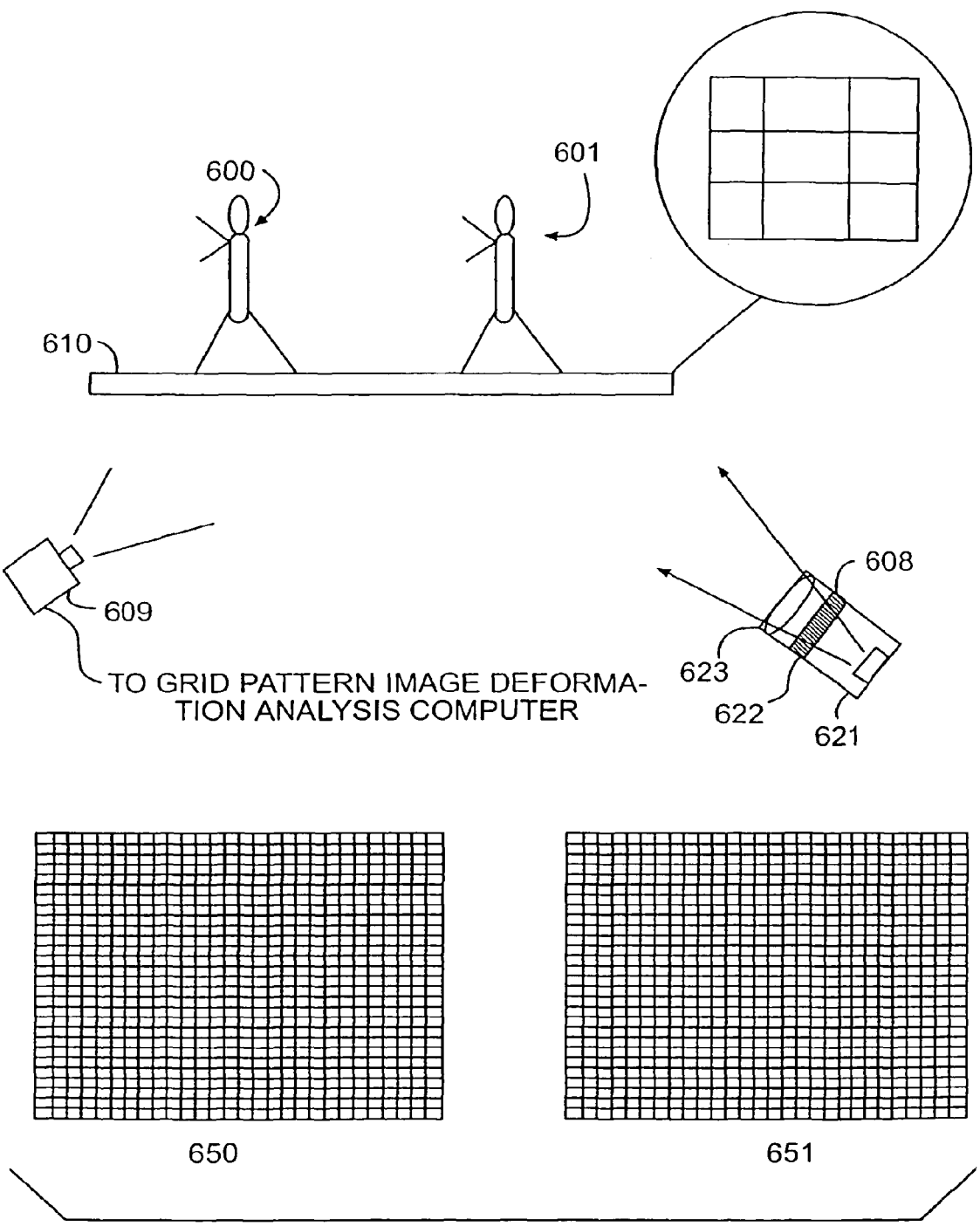
FIG. 6 illustrates a multipoint, or signature version of the invention, in a virtual environment situation. Also illustrated is the use of grid projection triangulation for surface distortion analysis, and a multi-segment version of the invention

Consider the case of FIG. 6 which shows the dancers whose foot patterns on floor plate 610 are dynamically monitored from the distortion of the rear of the floor, including the forces and the vectors of the forces which indicate their particular process. (As well their hand and head movements can be monitored from above using cameras, not shown, as in FIG. 5).

For illustration, in this example a grid projector 608 is utilized to project a grid on the back surface 611, which is imaged by TV camera 609 which detects via computer not shown local distortions in surface 610 caused by the dancers loads. Each foot location (4 total) is monitored independently, by detecting the local distortion beneath it, by comparing the grid in a rest state, to the one under load. As the over all grid shape can change, the change in the grid image can be time determinant. For example the average of the last 5 seconds of grid locations, can be compared at a local position (under a foot, say) to the instant one obtained in 33 msec. for example.

Triangulated Grid image 650 illustrates the case of shallow curvature of the surface 611 with no local distortion, whereas grid image 660 shows the effect of local distortion of two dancers.

It should be noted the touch pad can be used to identify or differentiate the people, via there foot patterns of indentation of the pad, or there signature of movement on the pad for example. Such identification can be instead of or in addition too any differentiation provided by viewing the people or coded targets thereon directly. Also co-ordination between foot movements, a targeted object and a projectile or other contact with a touch screen if used can be combined, so we know how an object was kicked, or who kicked it, etc. As another example, The position of the feet and the hands at the time the foot detection, or the screen detection of impact is made—all of these things can correlate together to make the correct identification or determination. Note that a projectile, such as a soccer ball can be tracked by the camera system.

The Importance of Stiffness

One key feature of the invention is that the optical distortion measuring device can have high resolution, allowing the surface member to be stiff while still providing an indication.

One of the key reasons why the D-SIGHT invention of ref 1 is so valuable for use in this invention is that it provides a very large area coverage with the possibility of detection of minute deflections. This is of great importance because of the need to have the surface member as stiff as possible in general to oppose the pressure of the touch and to create a uniform panel which can be used both for as a screen for television or as just simply a facade on some other instrumentation such as a dashboard, a writing tablet or the like.

For example, sheet steel 0.035" thick when pushed on with finger pressure will create a discernable indication on a 2 meter square panel imaged with D-SIGHT. Indeed one can visually on the TV screen trace one's finger when pushed on from the bottom, by looking at D-SIGHT image of the top of the steel.

A key problem however is to keep the total deflection down; for example, between the points suspended. For this reason it may be necessary to divide the system up into cells as shown in the inset, with the strengtheners at various cross positions which unfortunately cannot be measured at that point.

The D-SIGHT represents to my knowledge the most capable in this of all the technologies for measurement of surface distortion.

FIG. 7

Figure 7:
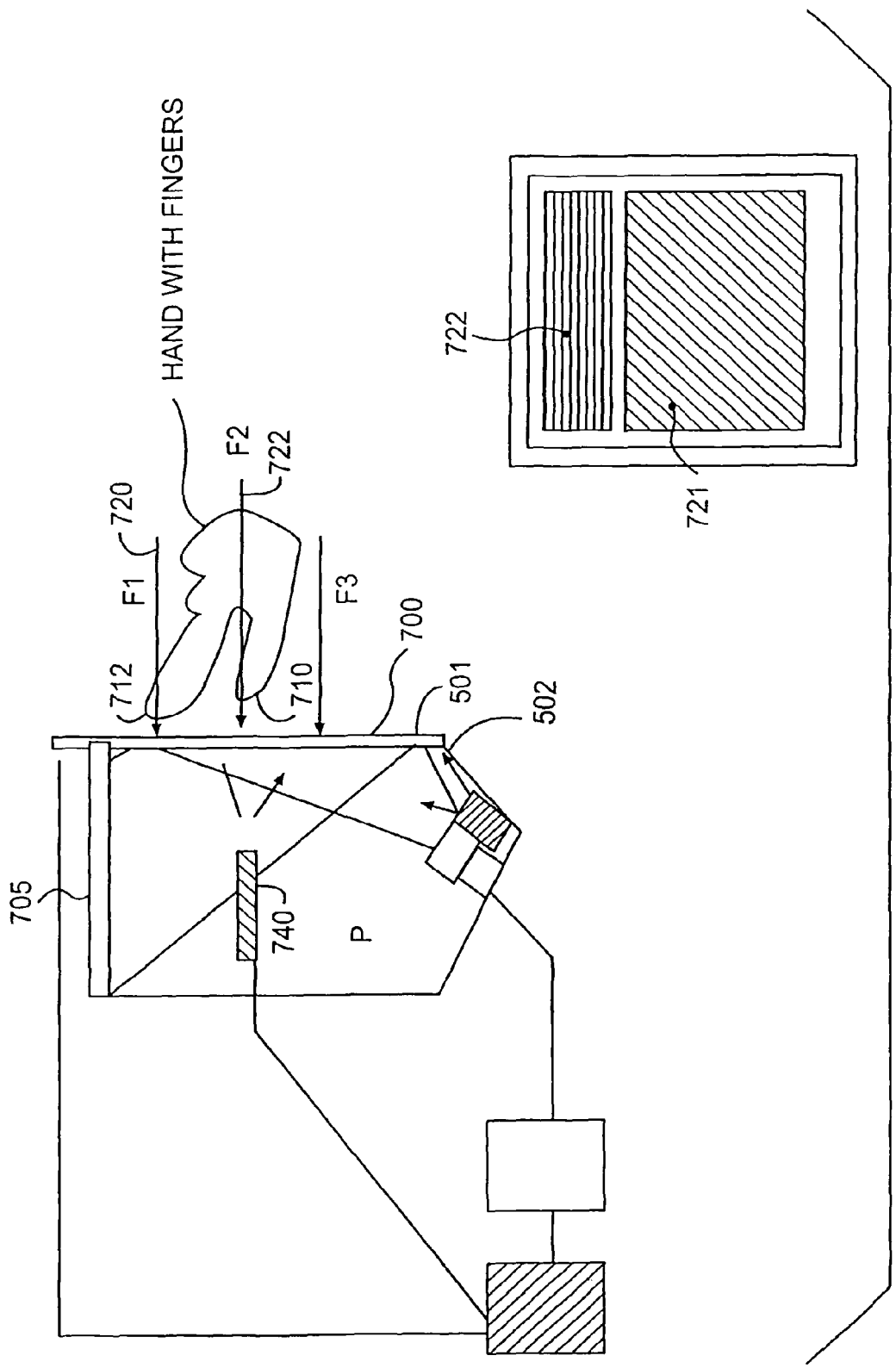

FIG. 7 illustrates an embodiment of the invention used for automotive dashboard or other touchpad keyboard type computer entry use, further illustrating multiple inputs and segmented pads.

As shown the pad 700 on dashboard (not shown), is located at a convenient position, and is used to input commands to the cars system, such as heat, light, etc. The particular thing of interest is that the index finger or thumb such as 710 may be used to press down to establish function, and the next finger over 712 used to act as a slider for degree of function desired. One can also give commands via sequential pulses, and also by the degree of pressing in, or the force vector.

Clearly more than one finger can be operative at a time. Two such force inputs are shown, 720, and 722, corresponding to action of fingers 710 and 712.

Of interest is that, where desired, an unsegmented pad can be used. For example, one doesn't need to care where the first input is as its home position is noted by a strong z force, (say by finger 712) and the closeness of the remaining forces (finger(s)) is the degree of function desired (say fan speed).

The pad can also accept a hand print, as a means of theft prevention, a taught signature can be recognized for starting the car.

The membrane used can have certain characteristics as well. It might have certain states such as undeflected, partial, and full deflected where it would snap like in a digital way. Note that you could physically vibrate the membrane with a Piezo crystal such as 705 under control of action generator 730 to cause a feedback signal to the user. In other words, if you were driving a car and you push in on the membrane when you reach a first point it would vibrate. When you reach the second point it could vibrate at a different frequency, or intensity, or pulse sequence, say.

The screen material may be composed of something which itself can vibrate such as piezo excitable or what have you. This then provides a feedback signal to the person touching the screen. Conversely, one can actually have at a position, a physical force element such as an air jet 740 or what have you, that actually feedbacks data to the touched point(s) in its area of operation. Feed back can be also be via a locally variable deflection with force (variable modulus of elasticity) too, based on some input that would cause the screen elements to stiffen or relax. Air pressure variation in cells of a transparent screen, or piezo elements etched in transparent silicon screens are possible methods which could be used.

It isn't just multiple points that can be detected. A complete "area" signature can also be detected. For example, a hand print can be determined from the deflection of the screen. Indeed, the device is capable of being used in this mode as a robot hand. One, forgetting the touch screen capability, where the imprint or impression left of the hand or any other object onto the screen, can be detected as such from the shape change of the screen.

Besides the use as in robot hands of detecting the part that might be picked up, it can also be used in the case here for example, in automobile to help one to identify from a written signature or a hand print or something, whether a qualified driver is present or not. The fact that it is not just 2-D but 3-D is a major improvement in this score. Other applications would be security systems for entry into buildings, even using the dynamic 3-D footprint of the person approaching the door if desired.

FIG. 8

Figure 8:
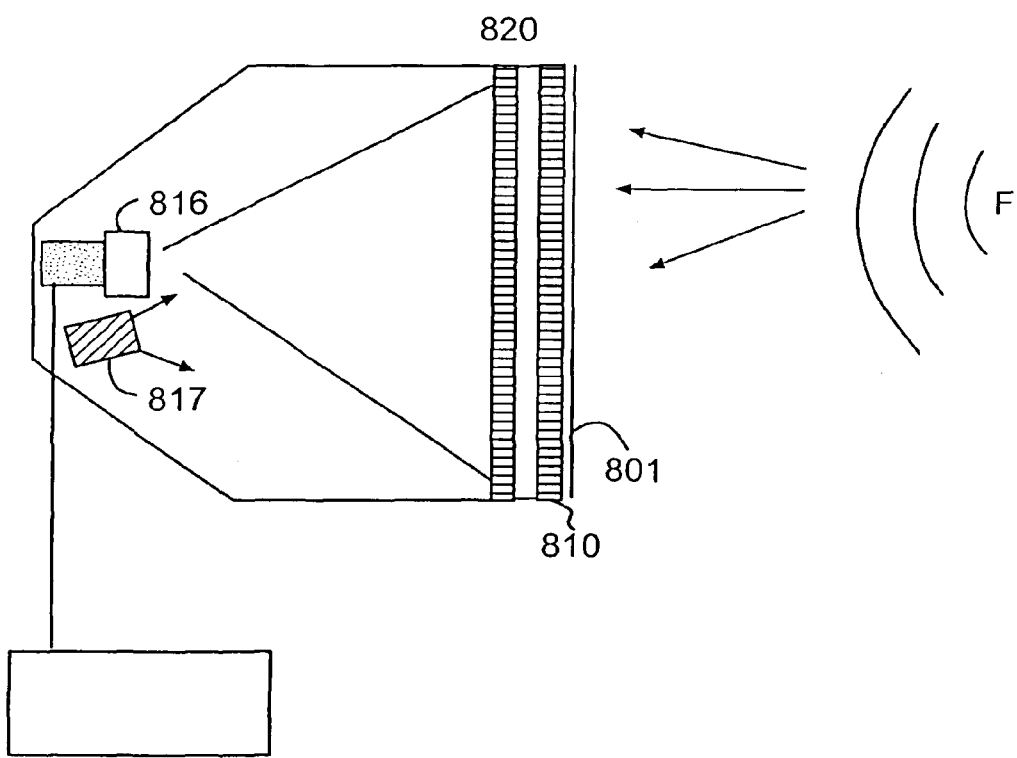
FIG. 8 illustrates a force field (electromagnetic, sound, or other) embodiment of the invention, using a moire grid transduction of surface distortion

FIG. 8 illustrates a further embodiment of the invention, illustrating the use of another method of optical image based surface deformation detection, coupled with a detection of electro, magnetic impulses or force fields.

As shown, a screen member 801 according to the invention such as 101 in FIG. 2, but in this case simply acting as a transducing medium and non transparent, is laid out in the form of a membrane with a grid of lines 810 on its surface, and illuminated by light 817.

Membrane deflection due to a time changing (or static) electromagnetic field F, produces a change in the grid pattern of light when viewed from a camera system 816 through a moire grid, 820. By known moire principles the distortion of the surface can be identified, and if desired, the degree of distortion calculated thereby. Clearly other time variant effects such as pressure waves from a loudspeaker, thermal effects and other phenomena can also be so determined.

Alternatively, the grid need not be located on the actual membrane but can be projected onto it in as in FIG. 6.

The use of TV based optical imaging to determine distortions over a large area at high speeds, is an important feature which helps the invention. While not as light efficient nor as useful as the FIG. 2 device, this nonetheless can provide the images. It is noted that a combination can be utilized wherein the grid pattern is on the screen and is viewed in this manner, also in conjunction perhaps with a moire grating or not.

FIG. 9

Figure 9A:
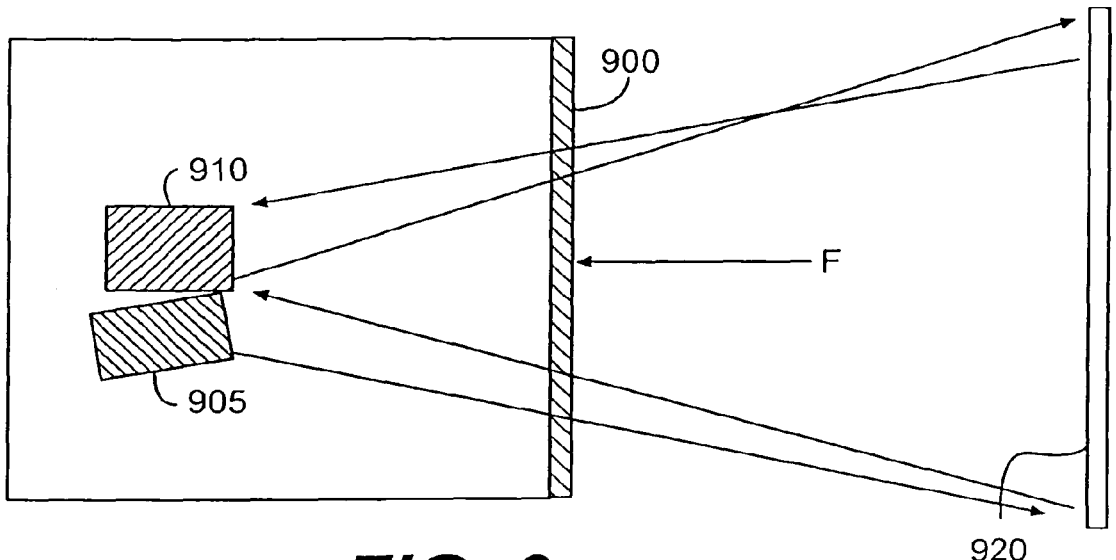
FIGS. 9a and 9b illustrate transmission and photoelastic variants of the invention. Also illustrated is a photoelastic based sensing of force location due to stress.

FIG. 9A illustrates a variant to the invention along the lines of FIG. 2, where the index of refraction of the material of screen 900, and its variation due to touch, hit, or other impact, F, is determined, when illuminated by light form source 905. In this case the camera 910 or, as shown in the figure, the retroreflective D-SIGHT screen 920 can be outside of the housing 925, if desired. While not generally desirable, there are certain types of simulations, etc. where this might be desirable.

Figure 9B:
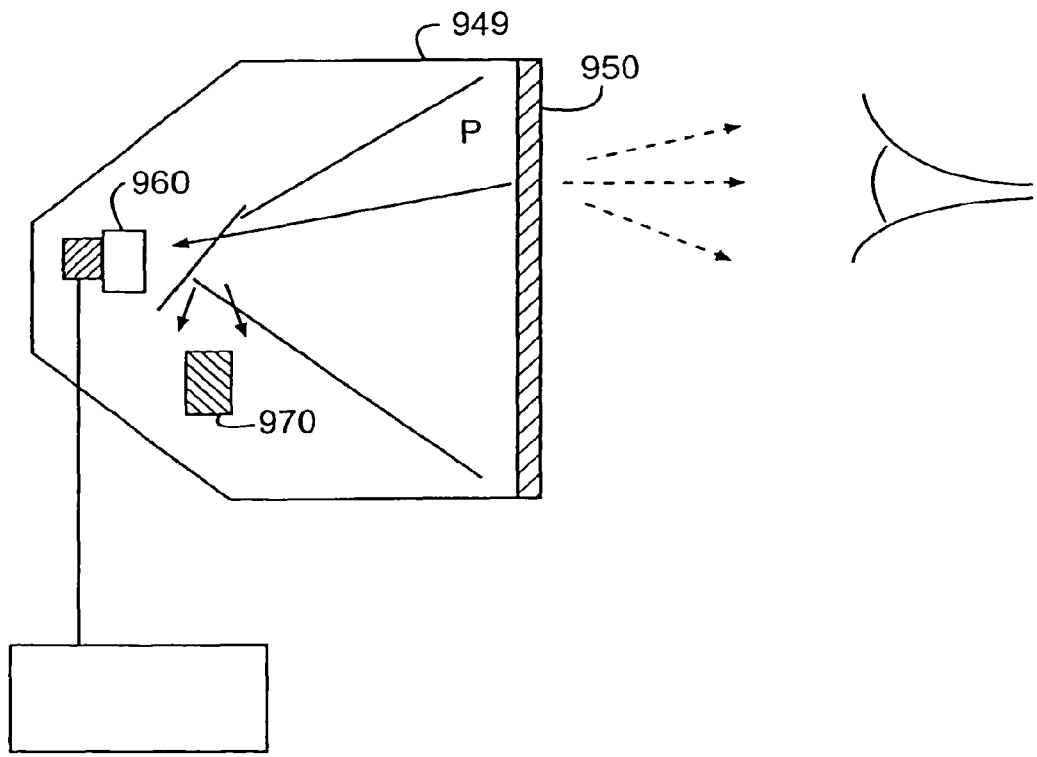

FIG. 9b illustrates an interesting projection TV arrangement wherein the beads 949 on the screen 950 act as retroreflectors for light used to measure the photoelastic stress in the screen material, while acting as diffusers for projected light from the TV guns and associated optics 960. Here, surface touch is converted to stress as opposed to a deflection. This stress is monitored over an area.

A touch pad screen according to the invention is thus contacted in a manner which creates a stress in the photoelastic member attached to a surface, or within the material having a surface. In a manner somewhat similar to the D-SIGHT invention, light penetrates through the photoelastic material member, strikes a surface behind it and is re-reflected back through the member. In this case it is not the distortion of the re-reflecting surface that is measured but the stress that has been placed into the photoelastic material. By using cross polarizers and known photoelastic techniques dependent on the differential index of refraction change with stress of polarized light, the stresses in the material can be monitored by TV camera 970 and this information converted to knowledge of both location of the stress, caused by the impact or touch, and its degree. This in a way is a better measurement of touch input than is deflection and allows the pad containing the screen to be very stiff.

There are problems with this system insofar as projecting light, since the rear surface (on the other side of the material whose refractive index changes) must be reflective and as a touch screen for projection TV for example it's difficult, although such transmission would be possible if the rear reflecting surface was not totally reflecting with the projection unit as shown.

Projection TV, it should be noted, is not the only way of doing this. One could have LCD type surfaces on any of these devices which would create a TV image on the touch screen of the invention.

Another embodiment of the invention uses a transmissive version. In this case the screen is located at an angle, and indeed has on it the LCD capability described. The light is projected through the LCD screen.

Summary of Applications of the Invention

Principal application areas of the disclosed invention envisioned at the time of this writing are as follows:

1. Aids to the disabled, where the unique force vector and multipoint and signature response characteristics of the invention can be used to advantage, to provide enough information so that an intelligent decision to what an input was supposed to be can be made.

2. Data entry over larger surface areas such as desk top CAD systems (which may or may not be combined with a touch screen), projection TV screens in the home or in video arcades and the like.

3. Interactive video games and simulations in general, where a touch, hit, etc., input is sensed with the invention.

4. Large simulations or displays (as in war rooms).

5. Practice such as, firing ranges and sporting events such as baseball practice, where a projectile "hit" input is sensed.

6. "Feeling" Touch screen or touch pad data entry, also at multiple points simultaneously where image objects can be rotated, moved, etc.

7. Special transducers e.g. for transient forces, also at multiple essentially simultaneous locations.

8. Automobile and aircraft cockpit or other data entry devices both in touch screen form and simply as a data entry device for example with a usable heads up display.

9. Non conventional data entry situations, as in feet on the floor, and signature analysis thereof, or hands on pad, for security and other purposes.

10. Medical analysis, for example of bone and muscular disorders as manifested as foot signatures on a touch pad of the invention.

Partial Re-Summation of Advantages Vis. a Vis. Other Known Touch Screens and Pads:

1. The invention can provide a 3, 4, and 5 dimensional touch screen or graphics tablet. In other words, the x,y location of the touch, the force or depth of the touch, and the vector direction of the touch (2 angles).

2. The technology is simultaneous multi-point. In other words, not just one finger can touch the pad or screen at once, all fingers can touch. In fact, not only can the fingers touch, wrists, elbows etc can also be registered (leading also to aids for the handicapped). Indeed 20, 30, 40, 50, 100, or even 1,000 contacts at once on a given screen or pad can be registered.

3. It is very well suited for very large screens or pads. This means that it can be used for wall sized simulations of hockey games, soccer, basketball, racquetball, military firing ranges, cockpits, and any other desired activity. Security systems, weighing and other transduction activities are also possible.

4. The screen in which one forms a touch screen can be virtually anything, because the screen itself is not the sensing medium, although its deformation is sensed. This means that all sorts of materials can be used as touch pads or screens, including and not limited to glass, plastic, armor plate, steel, KVLAR, etc.

5. The invention provides the only known ability to easily incorporate touch screen, let alone a 3-D touch screen capability, into a home projection TV. This has a wide ranging potential application for use in home shopping, and other remote data entry devices for the home, in addition to gaming and amusement. Any time you see something on the screen you can throw something at it or touch it—without the need for any special pens, wands, etc.

The ability to have such an interactive projection TV of let us say the 40" screen size and larger furthermore opens up a wide market for video arcade games, even ones which could be played in the home. The touch screen capability allows one to not only touch the screen with one's finger but given a suitably strength of screen, one can hit it with any part of the body, a projectile such as fired from a toy pistol of even throw baseballs at the screen, whatever.

When we add to that capability of having the video display not only show a video tape which could be made by the user himself, but also utilizing the latest 3-D display technologies such as that released recently by Toshiba, etc. to have a three dimensional TV with alternating images. One can actually have not only a 3-D touch and interaction capability but also a 3-D display capability. All of this on a capable home system which costs typically no more than $4000 in quantity.

When one considers the military and police simulators of the same ilk but perhaps with larger screens projecting let us say military or police combat scenes onto a screen perhaps in 3-D and allowing the trainee to actually fire at the screen with pistol or what have you. It would only be necessary to have frangible or hollow rubber bullets or something that would deflect the screen but not damage it in order to make such a simulation which would be as close to "real combat" as could possibly be imagined in the laboratory.

Similarly, displays or even just entry devices simulating the strike zone of a batter could be used for pitching practice in baseball. Video plays could also be made from a quarterback's eye view for football and you could throw the football at the screen registering at the screen the velocity and effect which would allow one to have a computer determine whether or not the receiver would have caught the ball. The same holds true with soccer, hockey, etc. dodging a goalie to kick a ball in, say.

As with all of these examples, the new generation of interactive CD displays and other optical memories would allow one to call up different image sequences depending on the 3-D sensed information from the touch screen. In other words if the quarterback threw the ball in such a way that it would be caught, one would simply have a video display of the ball being caught. However if the throw was off, let's say to the right or to the left, you could have a video display of that.

Virtual Reality and Simulation Using the Invention

To aid the interaction of the human with the computer in a way that allows the human to experience what the computer can simulate, improved methods are needed by which data can be more rapidly entered into computers, indicative of human wants, such as rotation of objects displayed on a screen, which have been designed, or otherwise created for animation etc. Some of these are often called virtual reality, and various means, such as position monitoring of head movements, "data gloves", which include measuring finger positions and joints, etc. have been proposed.

The touch screen of the invention can also be so used. It is simple and unobtrusive to the user, and monitoring 3.degree.-5.degree. of freedom of position and force of finger touches to an opaque or transparent screen, capable of displaying the TV image, allows imputing data to the computer control system to allow the image, or other data displayed to be modified in result of the human inputs.

FIG. 10

Figure 10:
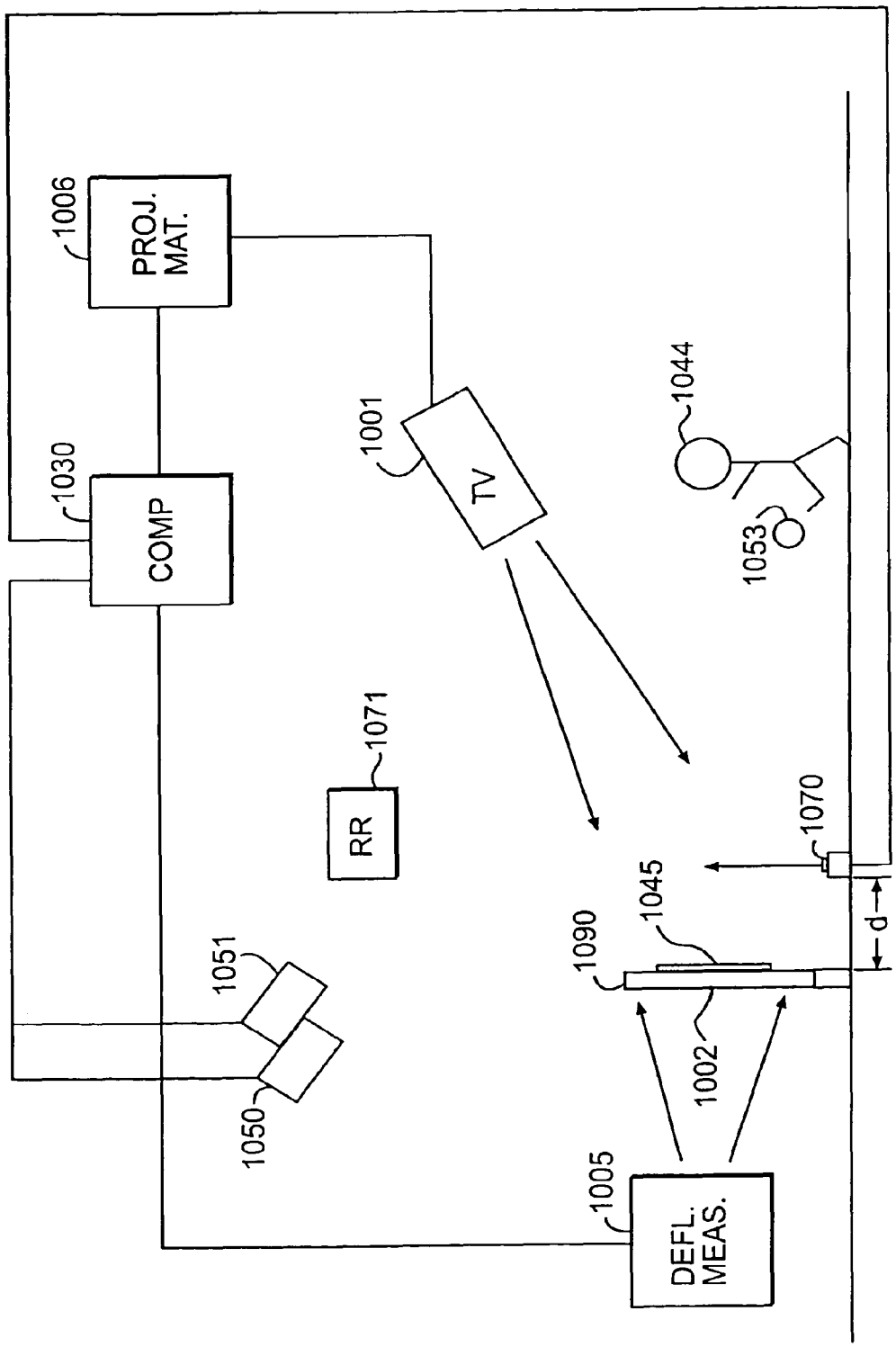
FIG. 10 illustrates further the use of the invention for dynamic projectile detection, and methods thereof used in a single or multiperson sports gaming simulator embodiment designed for sports bars or home use.

FIG. 10 illustrates a gaming simulator according to the invention usable in sports bars and home family rooms, for example. An overhead projection TV 1001, projects the video images desired, for example, still, video, or a combination thereof onto the screen 1002, which can be, per the above disclosure, either flat or curved.

The projection can be using known principles, either provided in a conventional manner, or in perceived "3-D" form, where special glasses or other artifices are utilized by the players, which may be one or more. In the three dimensional case, the added advantage, shown in FIG. 10, is that the goal or other target aimed at by the player can for example, be located apparently well behind the screens physical location. The single player case is described for clarity, but is similar to a multiple player case.

The goal of this simulation embodiment is to provide as close to real life gaming experience as possible within the cost constraints of affordability with respect to the actual projection TV system itself, which typically today runs on the order of $5,000-$9,000. In the particular examples shown, a Sony projection TV system capable of covering a 120" screen is provided. Larger more life-size units can also be used, where required for life-size gaming for example. New digital projectors from TI and others may make 20-30 ft screens possible in full color.

The goal of the game in the soccer mode, for example, is to kick a soccer ball at the screen, wherein a video depiction of actions of a world famous goalie are portrayed through the video system. A sports gaming module is provided, concerning the TV projector 1001, screen 1002, screen deflection measuring subsystem 1005 (built along any of the methods of the invention), video system to create material to be projected, 1006 (either from prerecorded matter, computer generated virtual imagery or whatever). This video system can include data taken straight from laser discs with reactive imagery called up directly from RAM memory in response to the sensed actions of the player taken (from screen deflection, overhead cameras, ultrasound, radar or other sensors).

For example, a typical soccer game is portrayed on a screen, as viewed by a player "forward" 1044 approaching the goalie 1045 displayed on the screen. The video is chosen from data taken ideally as to where the forward, in this case the game player is. This data can be taken from stereo cameras such as 1050 and 1051, or other devices as shown in previous figures above. As the player approaches the point where he wishes to kick the ball 1053 to score a goal, the goalie's movements are ideally called up from video memory to simulate what a goalie would do to looking in the direction from which the kick is to come.

In this case, the sensing system has determined the location of the person such as 1044 about to make the kick (the sensing system being from either TV cameras overhead coming outward from the screen, or using the invention, or other means to detect the location of the person on the floor). The computer controlling the video display, 1055, then orients the video toward the person, such that the goalie, for example, is looking more or less in his direction.

When the player makes the kick on a real ball, in the case of this low cost simulation system, we really don't know where the ball went (unless we had expensive ball tracking systems) until it hits the screen. When it hits the screen, we then can calculate from above, the location of the ball hit on the screen, and either knowing the location of the person who kicked it call up video from the projector showing where it would have gone. Conversely, using the invention to determine the shape or distortion of the screen, the trajectory of the ball, can be calculated as noted above.

At this point the system computer 1030 then calls from video memory immediately such memory being in RAM storage, such that it can be accessed instantly, the requisite shots showing the ball going in whatever direction it did, and showing, if desired, the goalie trying to stop it.

That effort completes the simulation at that point. A score for how good the kick was, how close to the goal it was, where it was within the goal, or the actual soccer score itself, as in 1 or 0 (depending on whether it went in or not), is registered, (and if desired, displayed on the screen) and the game continues with either other players, or whatever.

Because of the multi point aspect of this invention, and the ability to track multiple players in the field approaching the goal (or other target). One can actually have multi-person games, where the ball is actually passed between one and the other, and the actions still tracked and the game played. A floor based sensor system of the invention can track the location of players feet and the ball too as it impacts the floor. TV cameras or other means as described herein, can track the players as desired.

What has just been described in terms of a soccer game is clear with all games having a goal, such as lacrosse, hockey, rugby, and to a degree American football, in which case the goal is typically a goal line, except for the extra point kicks.

In order to execute the invention with video responsive to position, there is a means to detect the rough location of the person, and a means to detect the location of the ball in at least x, y, and z when it hits the screen. From these two pieces of data, not only can the actions from the video in the computer means be called up, but also the calculation as to the direction and distance that the ball might go.

Further illustrated in this figure is the issue of dynamic target detection. This goes beyond the description shown in FIG. 5 above. In order for the gaming simulators of the projectile type to work, such as those described in this figure, and in FIGS. 5 & 6 above, it is necessary to determine dynamically the location of a projectile impact, as well as, if desired, its z axis force/deflection, and potentially its trajectory, as well, from the shape of the disturbance on the screen. To provide this function, the camera system, or other optical, or non-contacting system observing the back of the screen has to be able to record the event in real time.

The first method of detecting a dynamic distortion is to simply take the frame of the camera, typically operating at a frame rate of 30 or 50 hertz, and analyze that frame each time to determine if something has happened. The frame then will handle the D-SIGHT image, or deflected grid image, or a triangulated grid image, or whatever type of full field image from the screen is desired, and the determination is made. This is economic, as camera systems operating these ranges are standard and below cost. The question is will it work, where the dynamic nature of the event?

There are two answers to this. First if the event is of a slow enough duration to where appreciable amounts of the event occur over the period of the frame integration, then the answer is yes. The only trouble being that a single frame then may be taken one more time, cutting the event, so to speak, in half. If this is a problem a specialized frame camera that records on an initiation of an event can be used. The event initiation can be determined by accelerometers, used to measure a seismic event on the screen, and therefore initiate the frame recording, or other optical means, as will be described, can also be used to register the event.

But if the event is very short, typically occupying only a few milliseconds, for example of actual indentation, then within a 33 or 25 millisecond frame, this is a small amount, and might go undetected. However, one of the advantages of the D-SIGHT approach is that the frame is integrated over the period, and thus a significant event that occurs anywhere within the period will be registered. This is also true of many other types of grid distortions, etc. The only thing is that the signal to noise may be less than it otherwise would have been, although this depends on the magnitude, as well, of the event.

If this is not sufficient for dynamic detection of an event, either faster cameras and processors can be used to search for the screen distortion, or a trip wire such as a photo switch can be used to initiate the scan. For example, a light curtain in this case comprising expanded field light source and detector 1070 and extensive retroreflector 1071 (extending out of plane of drawing) can be used to register to computer 1030 that the ball or other projectile has passed through. Since it is a known distance "d" from the screen of the invention, the approximate time to impact can be determined, an the appropriate camera readout commands be given. In addition, if the light curtain has the possibility to register where the projectile went through its grid, this data, and the screen impact data in x and y can be used to calculate the trajectory of the incoming projectile.

For example, consider a dynamic distortion, in this case of the D-SIGHT image used in a preferred embodiment to determine distortion of the rear of screen 1002 of FIG. 10, which illustrates the effect of a few millisecond indentation of a hockey puck on the front of the screen. If the camera frame rate is sufficient, the distortion can be detected, and the effect is integrated by the camera over the frame integration time. For example, if the effect is determined to be present in multiple frames, the one with the blackest or most area affected can be used to register the event.

Alternatively, and where desired, an accelerometer such as 1090 can register that the event has occurred, and this data can be fed to control computer 1030 which can if desired, strobe the camera used to capture the D-SIGHT image to freeze the frame integration after the event has occurred. This then can effectively shut out all other video noise from normal image events on the screen. However, this isn't really necessary where for example image subtraction (instant image subtracted from stored normal or quiescent image) is used, since in that case the event only creates a non-zero answer when it occurs.

In an optional manifestation, the D-SIGHT principle is also utilized, but with a separate channel for the integration of at least a portion of the surface D-SIGHT image onto a position sensing or other analog detector. This analog detector is set up in an AC coupled mode to be responsive to change in the image. When such change is detected, it triggers a flashed light or strobe of the camera shutter, which exists long enough to capture the maximum deflection or other desired condition of the screen.

With D-SIGHT, the change in the image can generally come from the redistribution of light within the image due to the occurrence. The detectors are optimally ones that have an ability to discern redistribution. However, I have found that in some cases change exists due to light exiting the system and other causes for at least significant disturbances, and this change, a drop in voltage corresponding to light not returning to the detector, can be determined with a simple photo cell.

While an optical detector as above can be used for a trigger, so can acoustic detectors. In this case, one simply listens for a sound, or a vibration, via an accelerometer, and strobes the camera.

In another potential embodiment, one can free run the camera, but only strobe in the last frame, or last 'n' frames into memory, once the acoustic signal is detected. By storing the last 'n' frames, one can sort through these frames later, and find the best image for use in screen distortion analysis (typically that with the stronger signal). In addition, the NTSC standard 30 frames per second are possibly too slow for certain types of activity in an unstrobed mode, and faster cameras can be utilized.

Another alternative is to use an auxiliary second camera having less resolution, but free running at high frame rate which is interrogated, let us say at 500 frames a second, to process the data, and determine if one or more pixels are different from the norm, indicating an impact. When that pixel is determined, the main camera may be strobed, to capture the impact at the resolution desired.

While optical readout of the screen for such target applications is desirable, it is alternatively possible in the invention to use acoustic pick ups for x, y, and to a degree z, (indentation) measurements. Upon impact of the projectile, consideration of the time of arrival of signals at each, is utilized to determine the location of impact. The magnitude of the signal sensed, is indicative of Z force of impact.

In a preferred mode of operation of the invention, at low cost today, prerecorded still images created by "Photo CD" or digital cameras are loaded in memory, and called up as a result of the location of the hit, or a touch, including the audio needed. Real time video can also be called up.

Much of the same description of this simulation relative to sports can be also done with firing ranges, where various 'bad guys' can be on the screen, and one can shoot at them. In this case, one or more players can be shooting at one, or more 'bad guys' on the screen, since the individual hits can be registered even simultaneously with the invention. It is also noted that the action of the bad guys to either being hit, or missed can be called up from memory.

A major difference between this firing range and those using 'mass-less' laser simulators is that you can use a police officer's (for example) own issued arm, in the mode it is intended to be used—a major training point. Frangible rounds and downward slanted screens can be used to prevent or deflect ricochets. Even rounds with different impact shapes or amounts can be used to allow identification of one participant vs. another from screen deflection, allowing multi-person firing simulations against opponents, situations or whatever.

A difference between most firing type applications and those of a soccer game is that in the case of firing, whether it's a gun, a bow and arrow, or whatever, is one can keep firing, and the game can continue, whereas in a sports context, once the ball is kicked that's it for that particular round (or hockey puck shot, or whatever).

In further considering the application of the invention to firing ranges for the use in military and police simulations, the location (and optimally force and trajectory) of the impact is detected, and a score is provided, relative to the location of and optionally severity of the impact on the image represented on the screen. Images can be presented of different scenes, and they can be presented in 3-D, where the screen is not at the point of desired impact.

Because of the ability to sense multiple points, even use of machine guns, and other very rapid firing systems can be used, since all of the hits can be registered, even if the frame rate of the camera is slower than the machine gun. This also is true for guns, such as shot guns that fire multiple pellets, or projectiles at once. It is noted that this system can be used in real time, as well, to align sights with guns, where the sights are gradually brought into position with the actual impact points of the bullets. This is, of course, and added advantage of the system for use in production of weapon systems.

In FIG. 10 example, it was chosen to use an Elmo model EM-102BW miniature solid state TV camera, positioned so as to be expanded via a minor to cover the majority of the screen. Reflection onto the retroreflecting material on the side of the TV wall and back to the camera after bouncing off the rear of the screen. Typically the screen of a rear projection TV is a fresnel lens, which has an additional front screen in front of it, with striations to spread the light laterally. This front screen may be made part of the fresnel lens, or removed. One can optionally leave the front screen in place, and touch the screen, and from that, touch the rear screen as well.

An LCD screen display can also be utilized, and its deflection determined. An LCD projector device can be used to project light on a screen of the invention, including those of a particular type, using alternating polarizations for 3-D display, if special glasses are utilized.

For ease of programming using today's video technology, the invention can use a combination of video background material, plus stills to order as a function of the input. A background scene might be video, but then when it comes to the action part of the video, initiated when one throws something, let's say at the screen, the remaining parts, the ones responding to the action, are stills. The goal here would be to make it simple to actually produce these without having to call numerous varied video clips from computer memory. As technology advances, stills could be compressed video. Important is to have near instant response, today provided by loading images into ram memory.

Keyboards

Another application of the invention is to provide keyboards for data input on the video screen (or even with out video on the equivalent of a touch pad). One can video display any form of keyboard on the screen, and the keys can be touched in and the touch response registered. One can arrange keys in any way desired, and other parts of the body, not just fingers, can be used to register inputs. Indeed the keys can be of any size or shape. This has advantages for the handicapped.

In addition one can tell keys because one know positions where they are on the projected video display or overlay or because of a special key indent shape or other signature. One can also create on the video new form of mouse, where sliding the finger on the screen or pad of the invention, causes a pointer to move on a display. One can also display on the screen a letter, which one can finger touch on the image directly The rear projection simulator of the invention can also be used to create a gambling machine as well, wherein video games of chance are interactively used to "'Play a game".

Handwriting Registration and Analysis

Indeed the invention is a unique data input system. For example handwriting can be registered on the screen and analyzed using suitable signature analysis programs. The screen deflects in proportion to data written with objects, or fingers, or whatever, and the information is analyzed.

Additional methods by which to determine the location, force, and direction, if desired, of the contacting screen, or touch pad of the invention are now disclosed.

In an embodiment shown herein, the characteristic of the screen is determined in its natural state where no input has been made. This natural quiescent state representation is stored, and compared at a future time to its instant state, with any differences noted in the desired location, force, or direction of the touch, or other screen deforming activity.

Optical imaging of the screen using a grid projection technique, employing retroreflection is utilized. In this case, the image of the grid, is made using the retroreflection principle where the light is projected onto the rear surface of the projection screen, then to a retroreflective panel such as made of Scotchlight 7615, on which grid bars have been provided, then back to the surface, and back to the camera. The image of the grid bars are provided, and stored. Instant images hence forward, for example every frame, are then compared to the stored values for deviations. Indeed, the deviated image caused by the reflection from the part surface essentially creates a Moire effect between the stored image, and the instant image, which can be immediately determine the distortion condition of the screen. This is different than described above (FIG. 6) in that it is the grid that is imaged, not the screen, and thus it is the reflection from the screen, rather than any image variation from the grid on the screen that is measured by the camera system.

It should be noted that an alternative version has the grid system projected from a point near the camera, as shown in dotted lines, allows a smaller grid to be utilized with a simple retroreflective screen, rather than the gridded screen shown. In both cases, the grid can be varied, either by mechanically switching the imaged grid, or by eclectically changing for example if it is an LCD generated type.

It is also possible to use the invention in this form to simply subtract the original image from the instant image, since with no change the subtraction is exactly the same, any instantaneous effects will cause some point of the image to change. This is true whether, or not the embodiment employing determination of a characteristic of deformation of the screen using a D-SIGHT image, such as 2 above are utilized in either the on-axis, or off-axis mode, or whether the grid images here described are utilized.

It is also possible to process the image to determine the location of a touch or impact, and simply subtract the processed answers, as opposed to the 'raw' screen image distortion data. This does not appear to have any advantage however over the a royal subtraction, unless one needs to discriminate against background noise that would otherwise still appear in the subtracted image.

It should be noted that the measurement of the deformation of the screen can vary. For example, in the versions which reflect off the screen, such as FIG. 2, it is basically the slope of the screen that is being measured, particularly the instantaneous slope around the point, or points, of contact of the touching object, or objects. This screen slope measurement is essentially because of the fact that Snell's law governing the reflection from surfaces is acting to 'move', and thus modify, the effective points of the image of the grid on the screen, or in the D-SIGHT effect the actual light variation returning to the camera.

However other methods of screen deformation measurement such as FIG. 6, may use triangulation, in which a zone of light, be it a spot, line, or grid projected onto the surface of the screen itself, and then imaged onto the camera system in some manner, (whether it's with scanned laser spots, or all at once with grids, or whatever).

In this case it is not the slope that is being measured, but the displacement at the point of contact.

This is typically not as sensitive to screen deformation, but such sensitivity in certain cases of pliable screens, and the like, may not be desired.

Another interesting point about triangulation is that for the grid and D-SIGHT reflection type methods used for slope, desired at the rear face of the screen being looked at is quite reflective. For types using triangulation, it is generally preferred that the rear face of the screen is somewhat diffuse. Given the close tolerance TV projection requirements, either situation can be accommodated since there is no impact on the TV image projection on either case.

The measurement of deflection slope or shape can be used as an indicator of touch screen or pad position or other characteristics. A finger touch distorts the screen.

FIG. 11

Another type of effect can be utilized to determine the location of screen distortion or deflection, wherein the direct reflected light field from the TV screen rear (or front) surface is viewed by a camera or other electro-optical detection system. The reflected light from the surface, which is ordinarily flat, or slightly curved in a typical TV system, becomes locally changed due to the effect of the touch, hit etc desired to be detected and located. Unlike the somewhat similar D-SIGHT effect, this has nothing to do with retroreflection, and uses but a single pass on the surface.

As shown, camera 1100 looks at member surface 1110 illuminated by light from light source 1115 which has been reflected from the back surface 1120 of projection TV screen 1130. On surface 1110 a dark spot 1140 occurs due to the indentation 1135 of screen 1130 by an impacting hockey puck (not shown for clarity). This spot is caused by local surface slope changes which direct light at that point away from where it normally would have fallen on surface 1110. The camera output signal is compared to a threshold value and if the level drops below the threshold, a indentation is determined to have occurred at the point in question in the image field of the camera. Alternatively and desirably, this threshold can be compensated for normal variation in light field across said screen, and can if desired used the calibration technique of FIG. 16. Indeed many other ways to detect such events such as described herein or other wise can be used, such as differentiation of the camera signal to determine points of rapid change indicative of a local hit.

Figure 11:
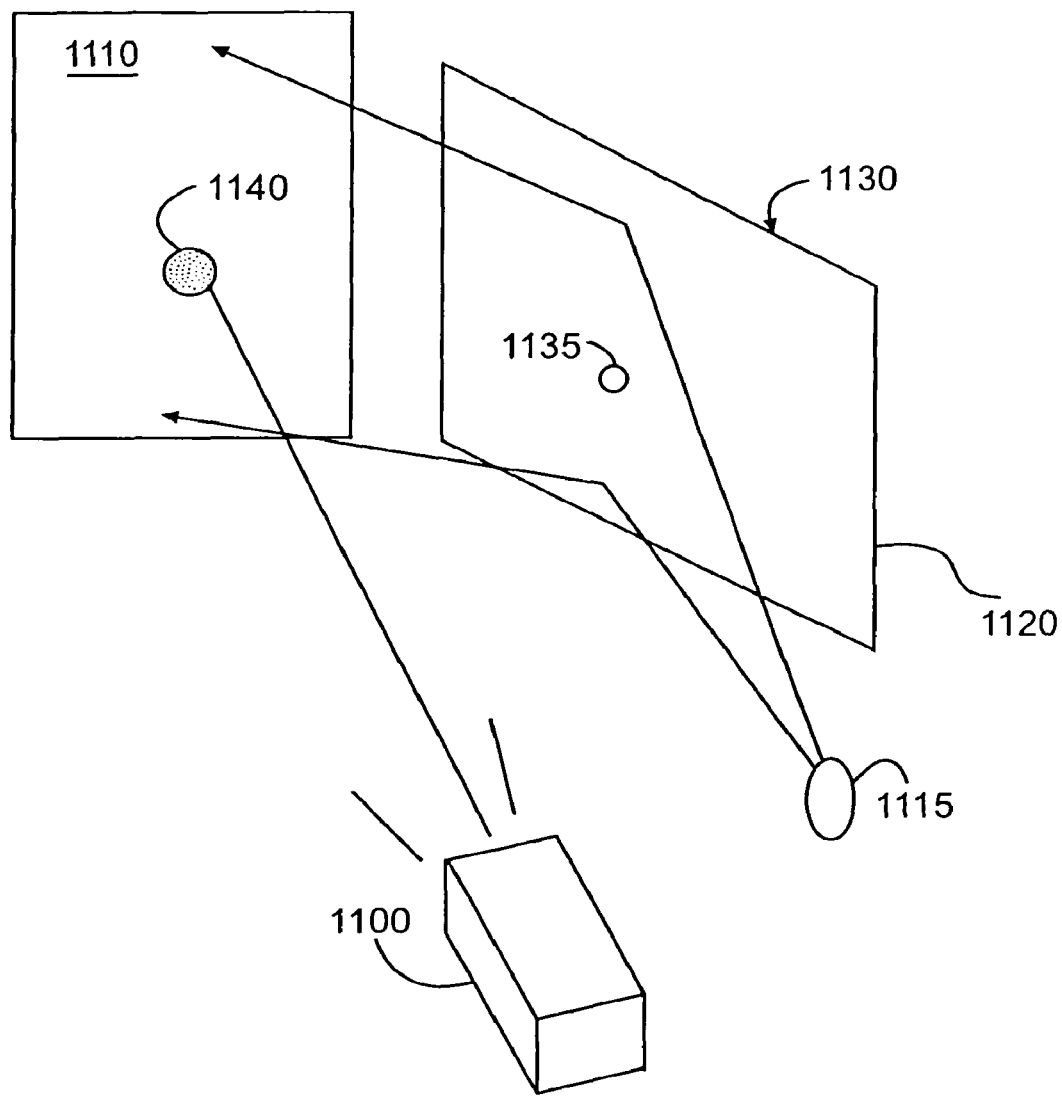
FIG. 11 is a D-SIGHT primary image embodiment of the invention

While one can therefore simply use the camera to look at the reflected light from a surface of a TV screen or pad, as shown in FIG. 11, this is not as light efficient as the use of the retroreflector, but is capable of monitoring the data desired.

With very weak signals of indentation or other screen deformation, the retroreflector techniques, or the moire grid comparison techniques discussed are quite sensitive. It is possible to use an analog image intensity or position detector (PSD) to see some of these effects. In particular, relative to noise, the analog detector, TV camera, or other detector, can be gated so that it only views the signal at the proper time; that is when the actual event occurs. In this case the onset of signal is detected independently and cued by other means, such as described above.

Conversely with strong indentation signals, such as feeling, grabbing and other actions using more deformable screens (i.e. not stiff), one must deal with significant local distortion magnitudes. The grid triangulation, conventional triangulation and stereo approaches can solve most problems of this type.

Note that we then are basically sensing the slope, the contour (which is overall shape), or the actual deflection.

It is also noted that other effects for measuring the screen can be utilized. For example, particularly in a front projection case, where the screen is opaque, the grid can be placed, physically on the rear of the screen. In this case, Moire techniques can easily be used, where an image of a grid on the screen is compared to an image of a stored grid, or of the same grid, for example, taken at a time where a screen was not displaced. This deformation of the screen then creates an immediate Moire effect. Indeed the reference grid can be located right behind the main screen grid.

Similarly Schlieren techniques can also be used to determine the slope changes in the surface, wherein fight is viewed a stop, and light that escapes past a stop due to slope changes is detected. The retroreflective technique however, shown in FIG. 2, is a method of making such systems in the simplest and least costly way, since all the light can be easily projected from a small lamp under the totality of the screen, and back again without complex optics, or expensive lights. It also tends to make it easier to operate on curved screens.

It is also noted that one can make the measurement by looking for the change in screen shape, or alternatively, if only an indication is desired, the fact that a shape change occurred. For example, by actually reading out the grid lines, and determining that one, or more are not straight, and if so, where one can operate the invention. This can be done either on a slope basis, or on a deflection basis. In either case, the ability to look at a large area, and find the point that made the maximum deflection, or slope change is quite different than that utilized in other types of measurements of, let's say, diagrams, where it is only the maximum point that is desired, as in pressure gages.

Note can measure deformation of the screen in an original undisturbed state, store the image obtained (with or without processing it to determine distortion therein), then subtract the instant test image (or processed version thereof)) or otherwise compare the original condition with instant condition Note to register a touch or impact, the screen is deformed and a number of variables representative thereof can be determined, such as a specific shape, a curvature, more than one shape or curvature, etc. A shape signature can be searched for. A second derivative function of the surface can also be derived indicative of an indentation.

Figure 12:
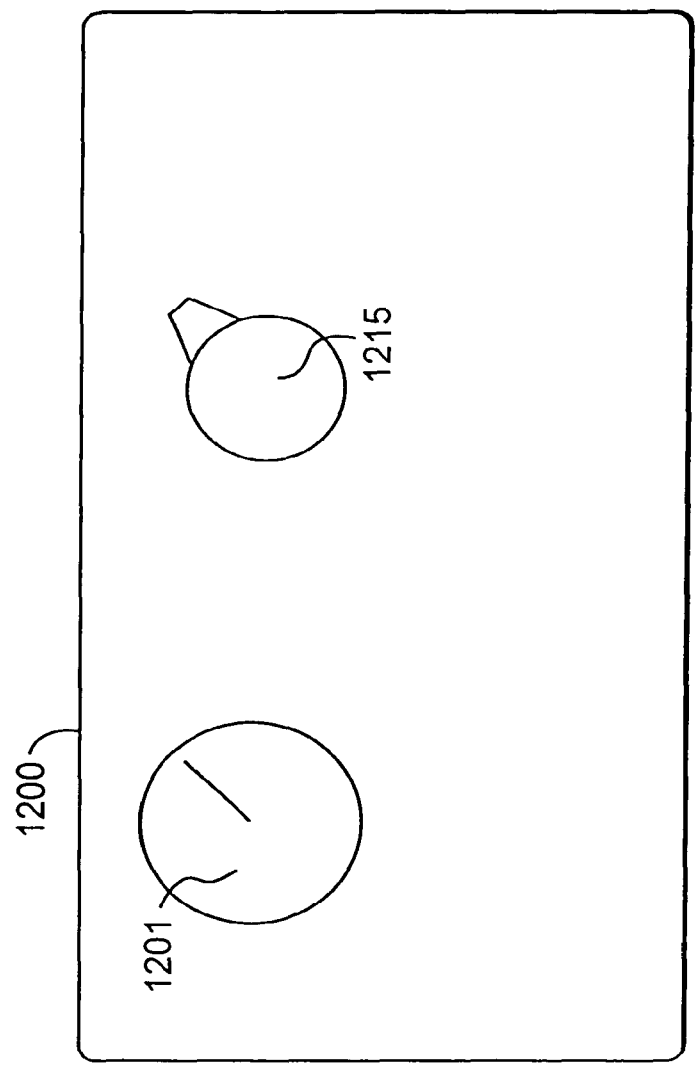
FIG. 12 is a Multiple simulator application type panel, including programmable knob or other features, and overlays using the multi point and tactile advantage of the invention

FIG. 12—Simulated Knobs and Levers, Also with Screen Overlays

FIG. 12 illustrates a multiple simulator application type panel 1200, including instruments such as dial 1201, and programmable knob, switch and lever (or other actuation devices) features, where the actuation devices are visually created using software on the screen, but actually "turned" by touching the deformable screen.

For example consider knob 1215, which exists as an image on the screen. By putting ones fingers on the image at the points one would touch the knob, and by indenting the slightly pliable screen a little ways and making a turning motion, one can get the feel of turning the knob—the TV image of which, using the invention, follows the finger turning motion used. Since everything exists in software, one can immediately change to a different control function as desired.

Conceivably one could even use these touch screen panels not just for simulators but for the real thing, i.e. a airplane or car dashboard or portion thereof, and change ones mind about where certain functions were, just by reprogramming the video and touch screen of the invention.

FIG. 13

Where desired, an "overlay" can be placed over the screen, or somehow made part of the screen, where the human operates the overlay function, such as a lever, and the overlay in turn touches the screen and deforms it to register the event, and magnitude thereof where desired. In other words, some sort of a lever contactor touches the screen.

Figure 13:
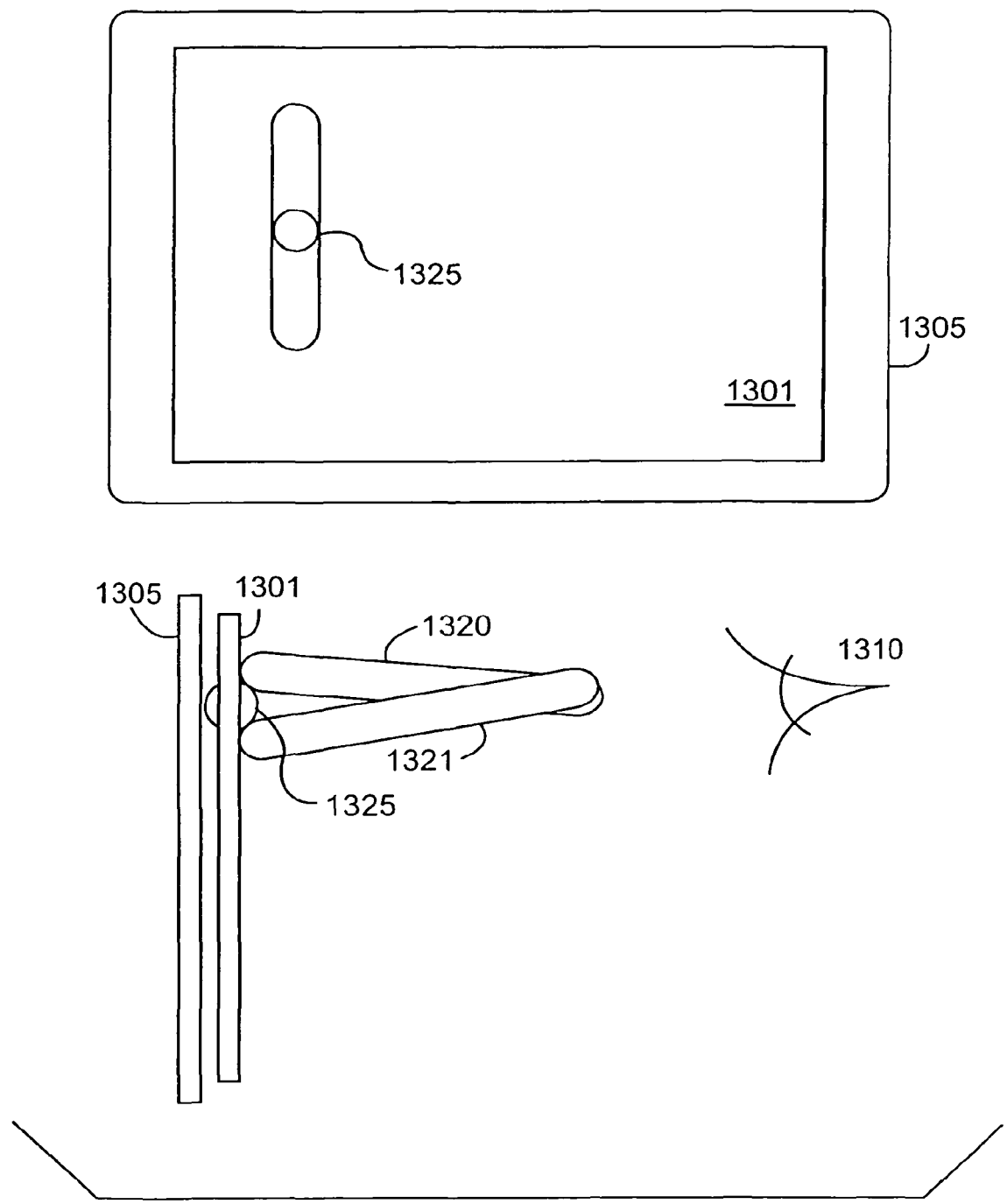
FIG. 13 is and additional overlay embodiment of the invention

For example consider FIG. 13 wherein overlay 1301 has been placed in front of screen 1305 and is viewed by user 1310. When the users fingers 1320 and 1321 move the lever 1325 on the overlay, the overlay pin 1330 indents (very slightly) the screen 1305 and causes the rear thereof to register the position of the lever, as described in the invention.

Multi-use is thus also possible; that is with contacting overlays, or other things, plus being used in front projection, plus rear projection, plus video games, sports, etc. an made possible in one system.

For cockpit flight simulators, dashboard simulators etc., tactile feel with programmability using the invention to achieve say a cockpit simulator of a Boeing 737 and a Dehaviland Dash 8 at different times is a big advantage. A key issue is something that is multi-point so that some of the control action, which could require two actions at once, like the throttles can be accomplished, and something that is a multi-point type function, and gives the sense of a rotation, turning a knob for example. Sliding, rotating, switch throwing are all examples of functions of interest.

For tactile feel there are interesting possibilities inherent in the touch screen of the invention. Clearly the projection touch screen can be deformable, which the heavy normal CRT glass can not, unless you put an overlay on it.

One of the ideas is to have the material, somewhat deformable, for example latex, or something stronger. This would allow one to sort of get the feeling that one was twisting something (e.g. a knob), even though it was not really twisted much. One might also sense thought the deformation in shape of the screen material, a characteristic proportional to the torque, or moment exerted.

For indenting something, as you would push the deformable material of the screen, you would get the feeling of resistance, and it's a little hard to say how this would work, relative to a push lever, or toggle switch, or something else. But it has a certain, at least, partial feel to it.

A touch screen overlay can also be transparent, but without the parallax inherent in thick overlays, because the rear projection effect allows one to project right on the front (i.e. the side facing the user) of the plastic overlay system.

The invention allows not just the sensing of a touch, but the sensing of the function of the overlay—including its deflection if desired. An overlay push switch, for example, has a feel of going in and out. It does not necessarily have to have it printed on the overlay, but then again it could be. The important point is that the movable needles, and other instrument features simulated are desirably from the stored TV images projected from computer memory. In this case therefore, the overlay is simply a push button that can deflect. But it's all transparent so that the light that's going to say what it is comes through from the back on the regular display. This means that in a pinch, it can also be operated without the overlay. The overlay adds basically the tactile feel.

To operate this embodiment, you would only have to have an x,y touch screen with the z direction sensed by the invention from the overlay portion. An overlay lever, could for example as well, simply be pulled along and used to make a linearly increasing D-SIGHT "dent", as a function of its position.

Note that the knob turned can also be used in this manner. Alternatively, it can make a different definable shape of indentation which can be recognized by the invention.

The invention can not just sense what the driver say of a simulated car is commanding, it can also record the driver's actions in the simulation—just to what the drive did with his hands, etc.

Note that if the slider, or push button, or whatever was actually transparent, the projected optical TV beam would go through it, and hit the front face of it. In which case, it would look just like the regular one. At the edges, there would be some funny stuff, but basically it would seem that you could build out of transparent plastic the various devices that were desired for the tactile feel.

In all embodiments, the touched screen can not only to be made of anything that works, so to speak, it also can be interchangeable. This is a major feature that is not shared with any other touch screen technology, and applies to both touch screens of the transmissive and opaque type. Interchangeable screens might include ones that were hard (stiff) for writing on versus softer, such as latex, etc. for feeling type games, etc. It might include screens that had touching response capability, such as "click' type details for typewriters, or even electronically actuated Piezoelectric bimorph portions of their surface for selective feedback to the response of people using them. Finally, other interchanged screens could also include overlays as part of the screen or that could be attached thereto for different functions, such as sliders, rotators, rotating knobs, etc.

Another embodiment can have a touch screen overlay, but without the parallax inherent in thick overlays, because the rear projection effect allows one to project right on to the plastic overlay system, and the invention allows not just the sensing of a touch, but the sensing of the function of the overlay—including its deflection if desired. Where desired, an "overlay" can be placed over the screen, or somehow made part of the screen, where the human operates the overlay function, such as a lever, and the overlay in turn touches the screen and deforms it to register the event. and magnitude thereof where desired. In other words, a human actuated contactor, such as a lever, touches the screen.

Figure 14:
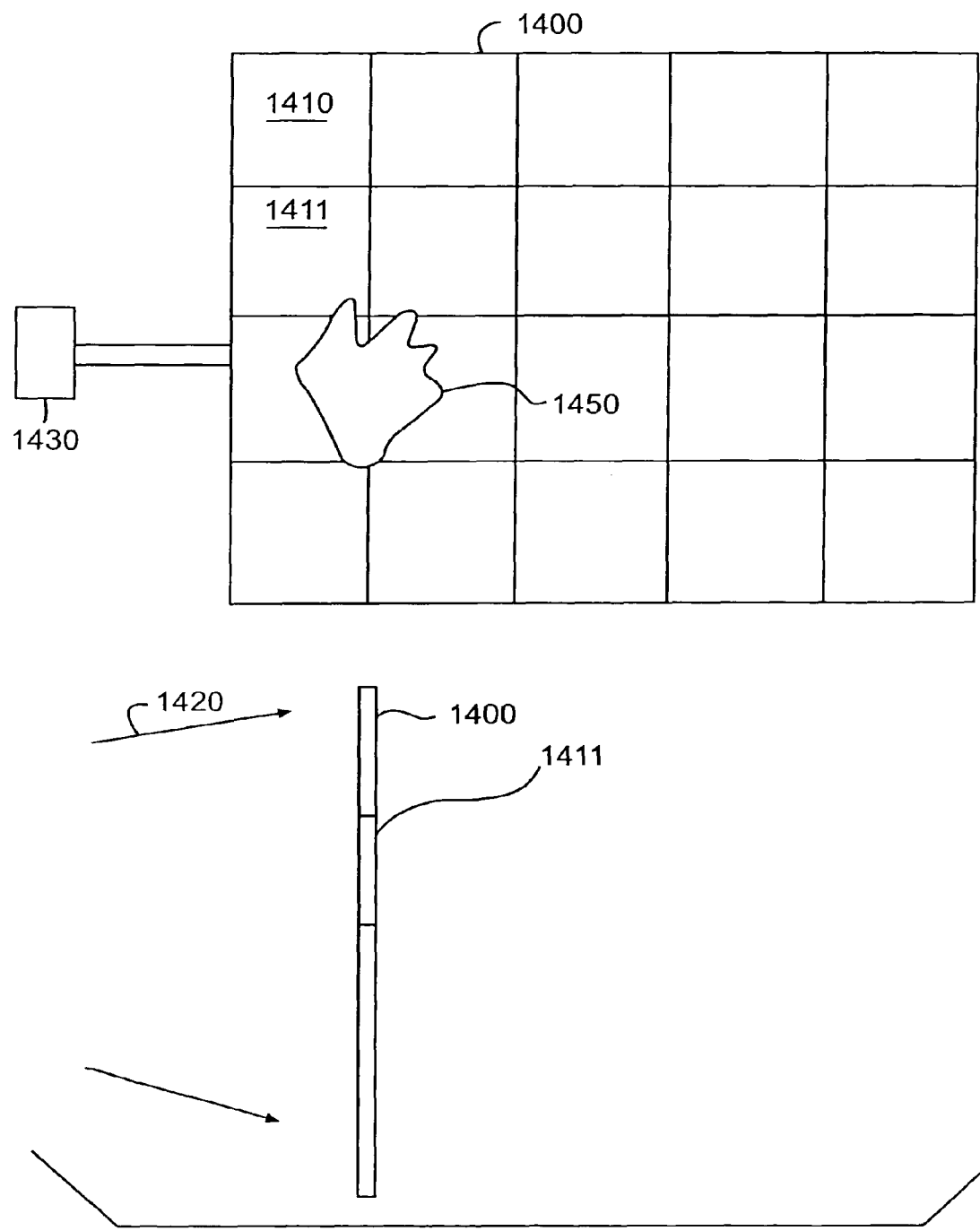
FIG. 14 is an embodiment of the invention having deforming bladders for touch and feel.

FIG. 14—"Feeling Screens"

As mentioned above, the invention uniquely may be used to create a "feeling" touch screen. Such a screen utilizes the deformable characteristics of an elastic TV screen, such as the plastic screen on the front of a rear projection television, and allows by the use of the fingers of the user touching this screen at one or more points such as those at which video data is displayed.

A preferred embodiment of the invention monitors the deformation of the screen in proportion to the "feel' of the operator, which essentially is related to the x,y,z location of deformation x and y, and the created deformation in z. Optionally the deformation in the direction of action in z can also be monitored to provide a vector field.

The principle applications of the feeling portion of the invention are seen as the manipulation of data, using additional inputs or added degrees of freedom, than are normally afforded by the use of a mouse, light pens, finger touch, or the like. Allowed is, not only the touching of multiple fingers, but the direction and degree of force utilized therefore.

Other embodiments of the invention envision provision, via a controlled piezoelectric actuation or the like, a resistive nature to the screen, which presses back against the user as a function of data desired. In addition the screen material itself can have a touch tailor made to the application. For example to simulate human skin for medical teaching, the screen can be made of a plastic or latex compound which feels like skin itself, while showing the TV image on its face.

Because the screen can be easily changed, another simulation using the invention can provide a completely different feel to the user. That is the screen material, and its feel can be changed. And if desired, its visual characteristics too can be changed—for example in its light reflection or transmission characteristics, color, appearance or whatever. In addition one can have pre treated screens which can be changed with different printed visuals, or scents, or whatever. Indeed it is envisioned that the optical (laser, projected light) or electron beam excitation of the screen material provided under programmable control for display purposes, can also be programmed to excite the screen to cause various smell or touch sensations to be generated in response to prerecorded program material or instant input from afar.

One example of a game is a children's petting zoo. In this game, the animal in question is displayed on the deformable screen of the invention. The child touches or pets (strokes) the animal. As he/she does so, the animal gives off appropriate sounds and moves about as one might expect. As the video image moves, the child may move his hand(s) to touch it accordingly. The hand input (and possibly voice recognition as well) is used to activate the movement of the animal. using the touch feedback modes described above (piezo, vibrational, balloon screens, etc). More than one child or one hand can touch either the one animal, or a group of animals on the screen using the multi-point aspect of the invention.

Note that one child can also touch an animal located halfway around the world, via the internet. The image of an animal or other object can be transmitted to the child player, and he can pet it from afar. Via the touch sensation aspects described above, the child can get feed back from his touching and respond accordingly—all with the object touched generated from afar—or from a CD ROM.

FIG. 14 illustrates an embodiment of the invention in which the screen itself is made of bladder like material capable of giving and/or receiving sensations of touch As shown, the screen 1400 is divided into cells, such as 1410, and 1411 each quasi flat and filled with liquid or gas. The image desired 1420 is projected through the cell. If it is desired to touch the image instantly visible on the outer surface of the cell 1411 for example (which is preferably transparent but with diffusive matte finish), the touch is registered by a pressure sensor 1430 due to the increase in pressure at the cell in question. If it is desired that the object represented by the "Image" be comprehended to touch the user, the cell is actuated, via a pump or other mechanism, to put out a pulse or series of pulses or whatever, to return a touch signal to the users hand (fingers, etc) 1450. As pointed out above, for utmost' frequency response in such matters, piezo electric membranes can be used for this purpose, arranged in as dense a grid as economically feasible.

While D-SIGHT principle of U.S. Pat. No. 4,629,319 is often the preferred means of distortion measurement, screen displacement or distortion can alternatively be done via triangulation. stereoscopic or other means. These alternatives are generally best for significant indentations which create slope changes that are too severe for D-SIGHT to give a reliable answer. For example where a latex touch screen of 50.times.35" dimension was used, the slightest finger pressure created slope changes which with almost no applied force caused a D-SIGHT based deflection analysis to indicate total black at the point in question—easily identifying the x y location of the touch, but effectively beyond the range limit of accurate local z deflection/distortion measurement.

A grid projection triangulation embodiment has been shown in FIG. 6 above. It is understood that rapid scanning of a point triangulation spot across the screen can also be used according to the invention to determine the location and degree of screen distortion. A Scanner capable of doing this is produced by Hymarc of Ottawa Ontario, under license from the Canadian National Research Council. Another is shown in my pending application incorporated herein by reference, entitled "Controlled Machining", and issued as U.S. Pat. No. 4,559,684—also illustrative of grid projection examples applicable to other embodiments of this invention.

FIG. 15

Figure 15:
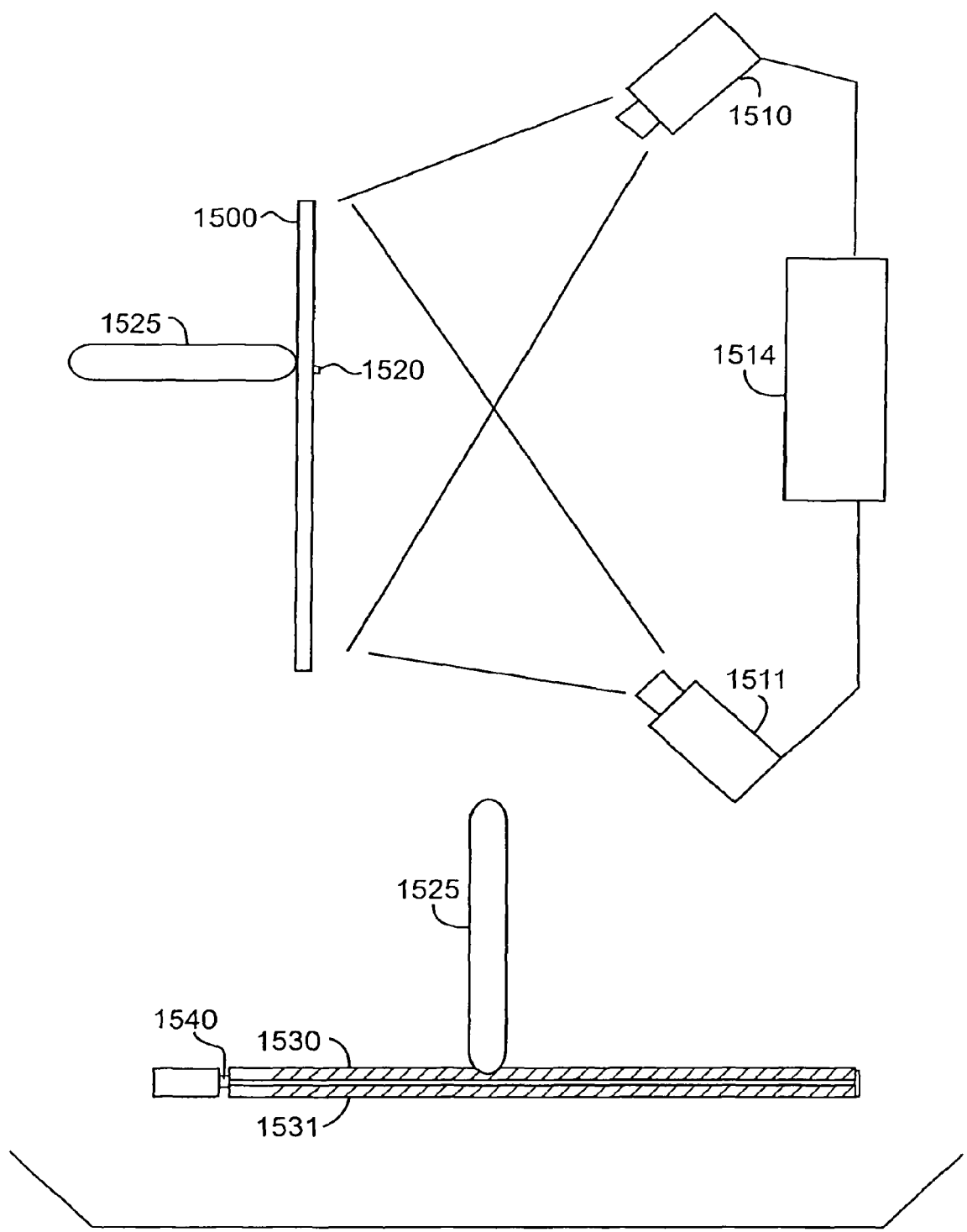
FIG. 15 illustrates a stereoscopic deflection determination, and correction matrix for the screen of the invention. Also illustrated is the case in which the screen is locally distorted so as to impact the light transmission or reflection from the screen from external sources not used in the TV display function.

An alternative stereoscopic screen deflection determination technique is shown in FIG. 15. A TV screen 1501 is monitored for deflection by a stereo pair of cameras 1510 and 1511 which have a field of view of the screen, and whose outputs are fed to computer 1514 which determines the x, y, and z, position of a point 1520 on the screen by comparing its location in each cameras field by known stereo triangulation techniques employing differences in the location of the point in question in the image field of each camera. Note that z is optional, and if not needed, only one camera can suffice.

The question is, what point on the screen has the contrast for the cameras to see? Clearly the point must be manifested to represent the touch or impact, not the normal video projection. Two possibilities, for example, are:

Event Causes Indication

In this case, the actual touch of finger 1525 onto the screen, causes a one member 1530 of a composite screen 1500 to press against a second, 1531 which then frustrates the internal reflection of near infrared (i.e. non bothersome to human observer) 0.9 micron wavelength radiation from IR LED 1540 bouncing between the two members. and causes either a light or dark signal (depending on design) visible to the cameras. The cameras, at the point of contact then see the point at which this exception indication occurs, which is stereo triangulated to determine its 3-D position.

The use of the screen itself to carry within it the light needed to register the indication is unique, and can be done in other ways. For example, a network of fiber type channels can go through the screen whose local transmission or reflection of light would be impacted by the touch or impact on the screen in question.

Indication Always There, Camera System Looks for Differences in Instant Screen Location or Shape vs. Stored Location or Shape.

An alternative is to continually solve for location of the screen, at a large number of points, and continually subtract the data once obtained from instant data at the same points. Any change any where in the field can then be highlighted, and its x, y, z location determined.

FIG. 16

Figure 16:
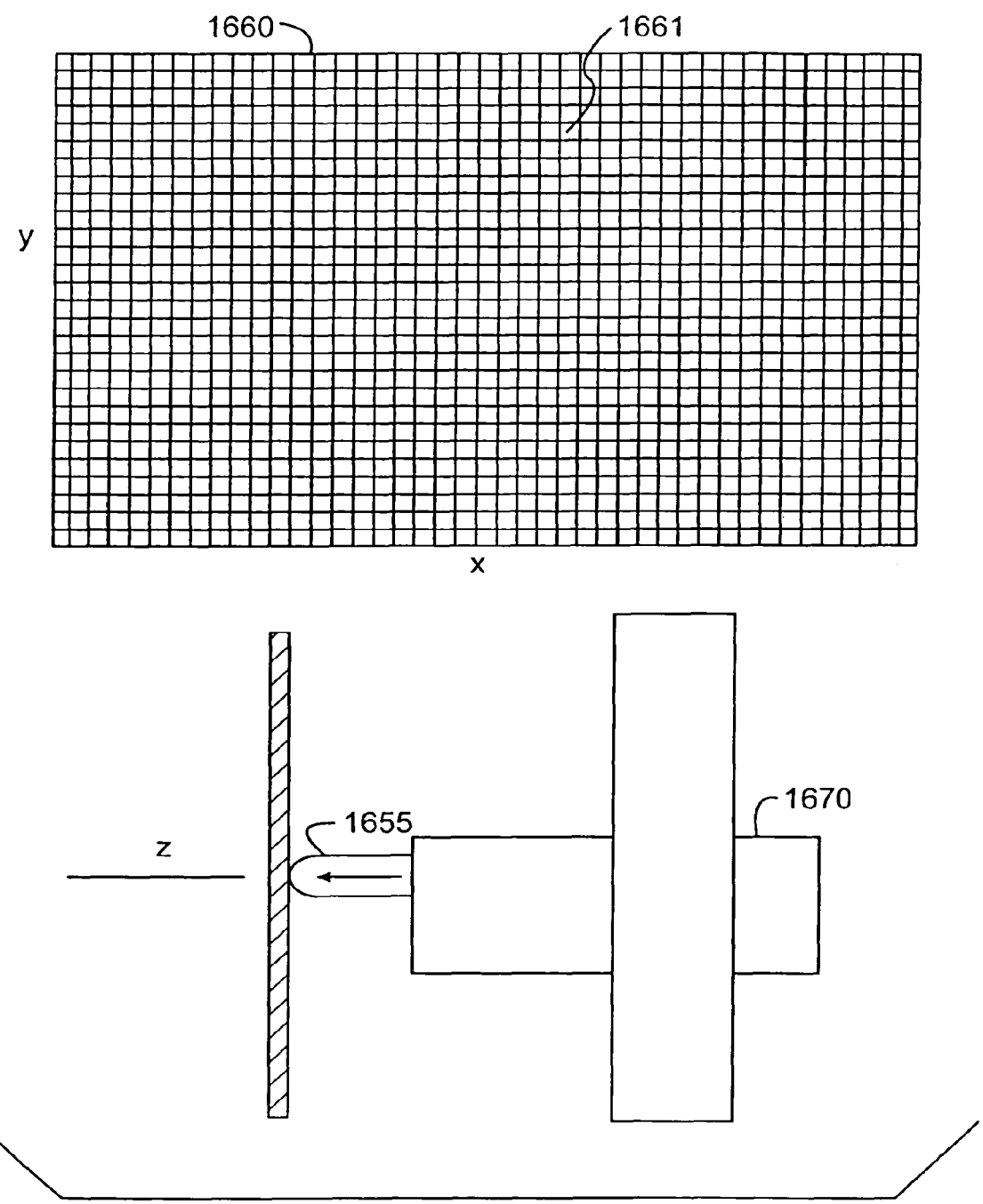
FIG. 16 is a screen location calibration system of the invention

FIG. 16 illustrates a correction matrix for position and force, usable with most of the embodiments of the invention. The TV screen 1660 is divided into "n".times."m" cells 1661, with in the sensor system measuring field of view, such as that of camera units above used for D-SIGHT imaging of the screen deflection. In a calibration mode, a sequential excitation of the screen is made, such as with indenter 1665 driven by computer controlled programmable positioner 1670. For each indentation of known amount, the x,y,z, registration is recorded, relative to the cell location and amount of indentation. This calibration table is then at a later time called from memory to correct a subsequent instant event position or amount.

FIG. 17

Figure 17:
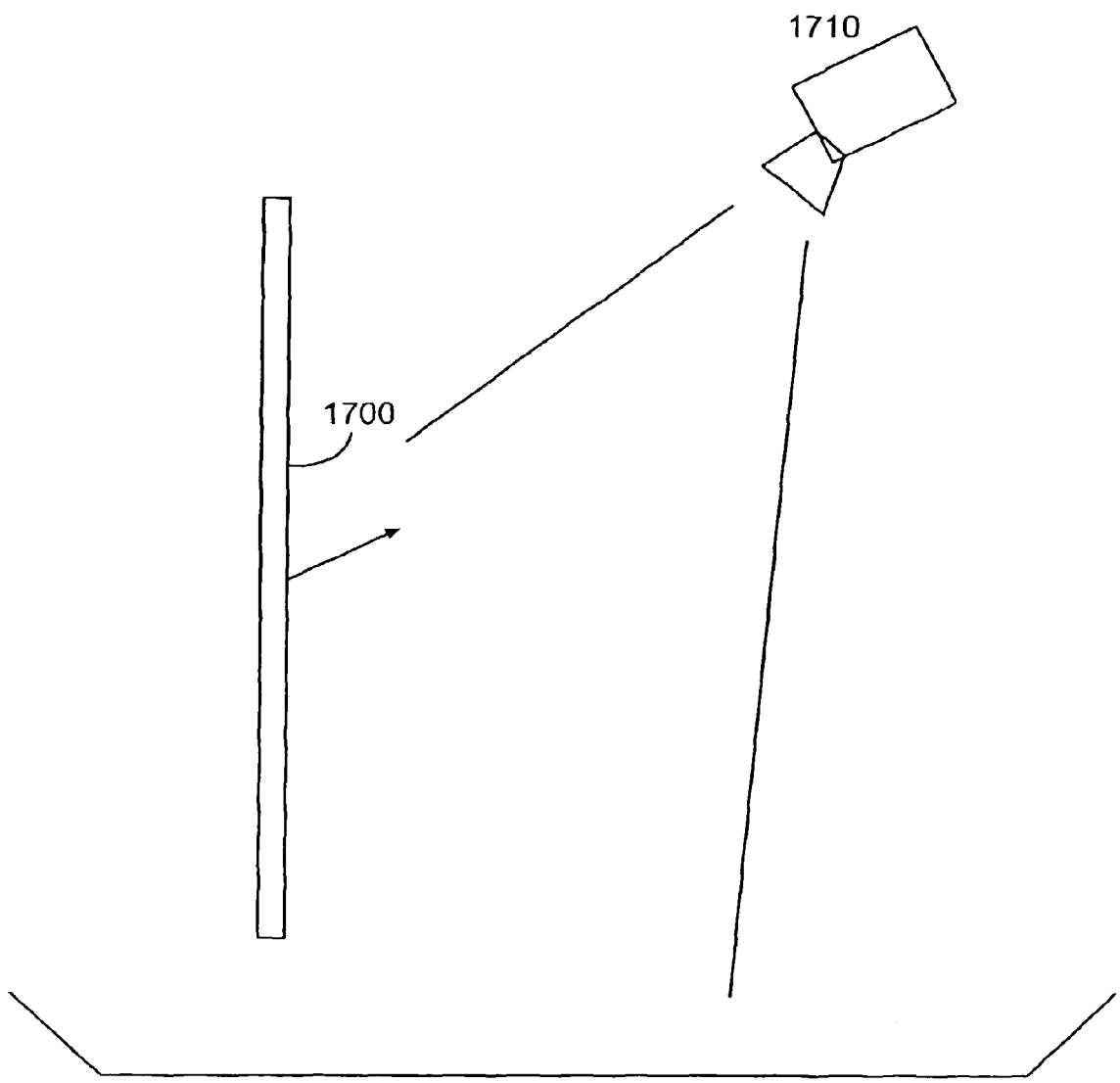
FIG. 17 illustrates a non optical embodiment for screen deflection determination—in this case radar based, which is optionally or alternatively capable of seeing an thrown object.

FIG. 17 illustrates a further screen sensing alternative, in this case non optical method of screen deflection or distortion measurement, especially valuable for use in impact based gaming. In this case a radar image is formed of the rear of the screen 1700, using phased array radar transmitter 1710 operating at 1.5 GFIZ. The transmitter is also capable of operating as a receiver, or a separate receiving portion is provided. As such devices are being considered for cars, it is likely prices will go down sufficiently to allow their use in TVs as here disclosed.

The data rate of the scan is 200 sweeps/second of the screen rear. The resolution desired is 100.times.100 over the screen surface in x-y, in order to sense the impact of a .'nerf' or other soft ball thrown at the screen, in this case a rear projection screen. 2.times.106 data points per second are acquired from the screen, using a pulsed mode radar to sense deflection over short ranges.

Such radar devices in a direct mode can see and if desired track sequentially the position or velocity of the impacting object itself—as shown in the front projection version of FIG. 17*b*. Note that in this case the ball hit on the screen is seen from the point of view of its appearance in the field of the radar sweep, and the degree of recoil of the object, which indicates velocity (unless one chooses to monitor the velocity of the incoming object).

The invention comprehends a screen of a composite that would have stiffeners in it that wouldn't be distracting to the viewer. For example, If the stiffeners are square, or shaped such that the rays from the projector TV would hit them in a parallel manner, and would not be deviated, then they would not be apparent. In addition, the screen stiffening portions could purposely be corrugated so as to deflect or refract projected light to other parts of the room.

Indeed the actual movement of the stiffeners could be measured, rather that the real surface of the screen. The stiffeners might be purposely designed to reflect or refract light or other suitable radiation to a sensing device—or away on impact or touch.

Miscellaneous Points.

Using the invention, one can code an input to the screen by detecting shape of the object used to indent the screen, from distortion image.

In the invention, one can use 3-D glasses on a user, so that a person or object one is interacting with appears behind screen. e.g. one kicks the ball toward a goal but before it gets to the goal, the screen deflection of the invention senses it going toward the goal and causes a result of action of the goalie etc in response.

In the invention one can use stereo cameras in TV looking outward at a player (or cameras overhead as shown previously) can see datums on player in 3-D so as to tell location relative to displayed image on screen.

Note one can have games where a player can shoot or throw something at screen and the object moves or says something in response to where the object hits the screen.

Note can also box or kung fu kick the screen and register a score. or engender a response from the other player represented on the screen (or transmitted by TV over the internet or modem or whatever. A multiperson game might be like a shootout at the OK corral, where multiple players all shoot at once at the screen.

In one embodiment shown herein, the characteristic of the screen is determined in its natural state where no input has been made. This natural state is stored, and further then compared sequentially to its instant state, with any differences noted and compared to the desired location, force, or direction of the touch, or other screen deforming activity.

Deflection of the screen can be via electronic means, where an electron beam or powerful laser excites the screen and deflection is memorized.

One can distinguish both deflection of screen at an arbitrary location, and its x and y location (as well as its z deflection if desired, or one can see even more detail in sense of distortion of shape of screen—this gives unambiguous data if screen is moving due to wiggles or waves caused by impacts or other disturbances, and can allow 5 axis data including trajectory of contact to be determined from the distortion.

For simple determining of where the player is relative to the screen coordinate system, any sort of sensor that can tell where he is can be used. It could be optical, ultrasonic, or radar, or whatever. It is desired to control the video of the TV as a function of the position of the player(s), and what he's doing. This could also include a military or police simulation. This is not just a person tracker, but can be a head tracker, or even to track a gesture, or other complex movement of the player as well.

Cameras make an excellent means to track targets on objects, which can be not just on the human, but something the human interacts with or even sits in, like a riding thing. A combination of targets on all of the above can be used so that a single camera can deal with multiple objects that are needed to be positioned, determined, and tracked. Note that TV cameras and other object tracking devices used with games can also track paddles, racquets, balls, etc. used in play.

If the projectile is targeted, or tracked, an automated other person can be put into play, such as a tennis player, a baseball batter, or other form of robot that would then hit the ball and return it.

The invention is good for interactive video, using the invention, one can interact with movies, grab objects unwrap, bend, punch, distort, move around objects, move multiple objects, etc.

The pliable screen could be of cylindrical shape like human standing up, or might be used to project a simulated cadaver for teaching medical students.

A touch pad of the invention, especially used as a multi-point pad can function as a mouse or other data input device. Since it can tell signatures, it can identify the user (via handwriting or other,) and one can use any object not just ones finger—e.g. a special shaped object, another part of ones anatomy, etc.

The invention can be used for remote interaction over the TV. Indeed can use the same stereo camera in TV used for target measurement, to look at a player image and transmit. One can touch the screen and get response video or audio as a function of whole experience, for example by a human from far away.

"'Light' as used herein, can be electromagnetic waves at x-ray through infra-red wavelengths.

The invention claimed is:

1. A touch interface comprising:
a touch surface defining a touch input plane, the touch surface being adapted to detect a touch input and adapted to determine a characteristic of the touch input; and
a transducer adapted to vibrate the touch surface in a direction generally perpendicular to the touch input plane in response to the touch input, wherein the transducer is operable to vibrate the touch surface with a tactile force feedback signal having a frequency selected as a function of the characteristic of the touch input.

2. A touch interface comprising:
a touch surface defining a touch input plane, the touch surface being adapted to detect a touch input and adapted to determine a characteristic of the touch input; and
a transducer adapted to vibrate the touch surface in a direction generally perpendicular to the touch input plane in response to the touch input, wherein the transducer is operable to vibrate the touch surface with a tactile force feedback signal having an intensity selected as a function of the characteristic of the touch input.

3. A touch interface comprising:
a touch surface defining a touch input plane, the touch surface being adapted to detect a touch input and adapted to determine a characteristic of the touch input; and
a transducer adapted to vibrate the touch surface in a direction generally perpendicular to the touch input plane in response to the touch input, wherein the transducer is operable to vibrate the touch surface with a tactile force feedback signal having a pulse sequence selected as a function of the characteristic of the touch input.

4. A computer implemented method for providing tactile feedback in response to input received from a user, the method comprising:
providing a touch surface defining a touch input plane;
detecting a first touch input on the touch surface;
determining a characteristic of the first touch input; and
vibrating the touch surface in a directional generally perpendicular to the touch input plane in response to the first touch input with a tactile force feedback signal having a frequency selected as a function of the characteristic of the touch input.

5. A computer implemented method for providing tactile feedback in response to input received from a user, the method comprising:
providing a touch surface defining a touch input plane;
detecting a first touch input on the touch surface;
determining a characteristic of the first touch input; and
vibrating the touch surface in a directional generally perpendicular to the touch input plane in response to the first touch input with a tactile force feedback signal having an intensity selected as a function of the characteristic of the touch input.

6. A computer implemented method for providing tactile feedback in response to input received from a user, the method comprising:
providing a touch surface defining a touch input plane;
detecting a first touch input on the touch surface;
determining a characteristic of the first touch input; and
vibrating the touch surface in a directional generally perpendicular to the touch input plane in response to the first touch input with a tactile force feedback signal having a pulse sequence selected as a function of the characteristic of the touch input.

7. A touch interface comprising:
a display screen including a touch surface defining a first plane to receive a touch input;
a touch sensor operable to detect a touch input on the touch surface and operable to determine a characteristic of the touch input; and
an actuator operable to vibrate the touch surface in a direction perpendicular to the first plane in response to the touch input, wherein the actuator is operable to vibrate the touch surface with a tactile force feedback signal having at least one of a frequency, an intensity, and a pulse sequence based, at least in part, on the characteristic of the touch input.

8. The touch interface of claim 7 wherein the characteristic includes the location of the touch input.

9. The touch interface of claim 7 wherein the force feedback signal is defined by a pulse imparted to the display screen.

10. The touch interface of claim 9 wherein the pulse is directed to a portion of the display screen underlying the touch input.

11. The touch interface of claim 7 wherein the touch input includes one of a finger and a thumb in contact with the touch surface.

12. The touch interface of claim 7 wherein the actuator includes a piezoelectric crystal.

13. The touch interface of claim 7 wherein the display screen is located in an automobile passenger compartment.

14. The control interface of claim 7 wherein the display screen is located on an automobile dashboard.

15. The control interface of claim 7 wherein the touch surface is operable to receive vehicle input commands.

16. A computer implemented method for providing force feedback in response to input received from a user, the method comprising:
    providing a display screen including a touch surface to receive a touch input;
    detecting a first touch input on the touch surface;
    determining the location of the first touch input on the touch surface; and
    vibrating the touch surface in a direction generally perpendicular to the touch surface in response to the determining step to provide a tactile first force feedback signal to a user.

17. The method according to claim 16 wherein the display screen is operable to display visually observable data.

18. The method according to claim 16 wherein the first force feedback signal includes at least one of a frequency, an intensity, and a pulse sequence selected as a function of the location of the first touch input.

19. The method according to claim 16 including providing an actuator.

20. The method according to claim 19 wherein the actuator includes a piezoelectric crystal.

21. The method according to claim 16 wherein the first force feedback signal indicates a function selected by the user.

22. The method according to claim 21 wherein the function selected by the user is a vehicle control function.

23. The method according to claim 16 wherein the first touch input includes one of a finger and a thumb in contact with the touch screen front surface.

24. The method according to claim 16 wherein the display screen is located in an automobile passenger compartment.

25. The control interface of claim 16 wherein the display screen is located on an automobile dashboard.

26. A computer implemented method for providing force feedback in response to input received from a user, the method comprising:
    providing a display screen including a touch surface;
    detecting a first touch input on the touch surface;
    determining the location of the first touch input on the touch surface;
    vibrating the touch surface in a direction generally perpendicular to the touch surface in response to the determining step to provide a first force feedback signal to a user;
    detecting a second touch input on the touch surface;
    determining the location of the second touch input different from the location of the first touch input; and
    vibrating the display screen in a direction perpendicular to the touch surface to provide a second force feedback signal different from the first force feedback signal.

27. The method according to claim 26 wherein the second touch input includes one of a finger and a thumb in contact with the display screen.

28. The method according to claim 26 wherein the second force feedback signal is directed to a portion of the display screen underlying the second touch input.

29. The method according to claim 26 wherein the second force feedback signal includes at least one of a frequency, intensity, and pulse sequence selected as a function of the location of the second touch input.

30. The method according to claim 26 wherein:
    the first force feedback signal includes a first frequency; and
    the second force feedback signal includes a second frequency different from the first frequency.

31. The method according to claim 26 wherein:
    the first force feedback signal includes a first intensity; and
    the second force feedback signal includes a second intensity different from the first intensity.

32. The method according to claim 26 wherein:
    the first force feedback signal includes a first pulse sequence; and
    the second force feedback signal includes a second pulse sequence different from the first pulse sequence.

33. The method according to claim 26 wherein:
    the first force feedback signal indicates a first function selected by the user; and
    the second force feedback signal indicates a second function selected by the user different from the first function selected by the user.

* * * * *